US011156171B2

(12) United States Patent
Inoue et al.

(10) Patent No.: US 11,156,171 B2
(45) Date of Patent: Oct. 26, 2021

(54) CONTROL DEVICE FOR COMPRESSION IGNITION ENGINE

(71) Applicant: Mazda Motor Corporation, Hiroshima (JP)

(72) Inventors: Atsushi Inoue, Aki-gun (JP); Yusuke Kawai, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 134 days.

(21) Appl. No.: 16/737,050

(22) Filed: Jan. 8, 2020

(65) Prior Publication Data
US 2020/0248636 A1 Aug. 6, 2020

(30) Foreign Application Priority Data
Jan. 31, 2019 (JP) .............................. JP2019-015257

(51) Int. Cl.
| | |
|---|---|
| *F02B 47/08* | (2006.01) |
| *F02D 13/02* | (2006.01) |
| *F02M 26/01* | (2016.01) |
| *B60W 10/06* | (2006.01) |
| *B60W 10/10* | (2012.01) |

(Continued)

(52) U.S. Cl.
CPC ......... *F02D 13/0261* (2013.01); *B60W 10/06* (2013.01); *B60W 10/10* (2013.01); *B60W 30/18181* (2013.01); *F02D 41/005* (2013.01); *F02D 41/006* (2013.01); *F02D 41/401* (2013.01); *F02D 41/402* (2013.01); *F02M 26/01* (2016.02); *F02P 5/045* (2013.01); *F02P 5/1516* (2013.01); *B60W 2710/0666* (2013.01);

(Continued)

(58) Field of Classification Search
CPC ........ F02M 26/00; F02M 26/05; F02M 26/06; F02M 26/01; F02D 41/006; F02D 41/0047; F02D 41/005; F02D 2200/0406
USPC ............ 123/568.11, 568.14, 568.21, 568.22, 123/568.26
See application file for complete search history.

(56) References Cited

U.S. PATENT DOCUMENTS

| | | | |
|---|---|---|---|
| 2016/0102616 A1* | 4/2016 | McConville | ........ F02D 41/0087 123/334 |
| 2016/0102620 A1* | 4/2016 | Ervin | .................. F02D 41/0087 123/345 |

(Continued)

FOREIGN PATENT DOCUMENTS

JP 2009197740 A 9/2009

*Primary Examiner* — John Kwon
(74) *Attorney, Agent, or Firm* — Alleman Hall Creasman & Tuttle LLP

(57) ABSTRACT

A control device for a compression ignition engine is provided. At least in a high-load range where an engine load is higher than a given value, among an operating range where a partial compression ignition combustion is performed, an EGR valve is opened, and a first injection in which fuel is injected at least from an intake stroke to the first half of a compression stroke is carried out. While an engine body is operated in the high-load range, when a torque down request and a request for reducing external EGR gas amount introduced into the cylinder are issued, the opening of the EGR valve is reduced, and a second injection in which fuel is injected in the second half of the compression stroke is carried out, and a ratio of a fuel amount of the second injection to the total fuel amount injected in a combustion cycle is increased.

6 Claims, 11 Drawing Sheets

(51) Int. Cl.
  *B60W 30/18* (2012.01)
  *F02D 41/00* (2006.01)
  *F02D 41/40* (2006.01)
  *F02P 5/04* (2006.01)
  *F02P 5/15* (2006.01)
  *F02M 26/00* (2016.01)
  *F02D 41/38* (2006.01)

(52) U.S. Cl.
  CPC ............... *B60W 2710/1005* (2013.01); *F02D 2041/389* (2013.01); *F02M 2026/009* (2016.02)

(56) References Cited

U.S. PATENT DOCUMENTS

2019/0360409 A1* 11/2019 Sueoka ................... F01L 1/22
2019/0360450 A1* 11/2019 Sueoka ............... F02D 13/0207
2019/0360451 A1* 11/2019 Sueoka ............... F02D 41/1475

\* cited by examiner

CONTROL DEVICE FOR COMPRESSION IGNITION ENGINE

TECHNICAL FIELD

The present disclosure relates to a control device for a compression ignition engine including an engine body where a cylinder is formed, an ignition device which ignites a mixture gas inside the cylinder, an intake passage where intake air introduced into the engine body circulates, and an exhaust passage through which exhaust gas discharged from the engine body passes, wherein partial compression ignition combustion in which, after a portion of the mixture gas inside the cylinder carries out jump-spark ignition combustion, compression ignition (CI) combustion of the remaining mixture gas is carried out by self-ignition, takes place in at least a part of the operating range.

BACKGROUND OF THE DISCLOSURE

It is considered that, in engines provided to a vehicle, etc., partial compression ignition combustion in which a portion of the mixture gas is self-ignited is performed in order to improve fuel efficiency. It is necessary for the partial compression ignition combustion to raise the mixture gas to a temperature at which the self-ignition is possible. Therefore, in order to realize the suitable partial compression ignition combustion in an operating range where the temperature inside the cylinder tends to be low, it is desirable to raise the temperature of the intake air introduced into the cylinder. However, if the temperature of the intake air introduced into the cylinder is simply raised, the temperature inside the cylinder becomes excessively high in an operating range where the temperature inside the cylinder tends to be high, and a timing at which the mixture gas self-ignites becomes earlier than a desired timing.

On the other hand, JP2009-197740A discloses an engine in which the mixture gas is self-ignited in a low-speed low-load range where the engine speed and the engine load are low. In a partial range of this low-speed low-load range where the engine load is low and the temperature inside the cylinder tends to be low, an amount of internal EGR gas (exhaust gas which remains in the cylinder) is increased to raise the temperature inside the combustion chamber, and in a partial range of the low-speed low-load range where the engine load is high and the temperature inside the cylinder tends to be high, an intake valve is opened at an early stage to draw a portion of internal EGR gas into the intake passage, and the portion of internal EGR gas is cooled by fresh air, and is then flowed into the cylinder again.

In the engine disclosed in JP2009-197740A, the temperature of internal EGR gas is lowered in the range where the temperature inside the cylinder tends to be high, and therefore, it is thought that the rise of the temperature inside the cylinder can be prevented to some extent. However, the internal EGR gas is burnt gas which remains in the cylinder (i.e., gas after combustion), and the temperature thereof is high. Thus, the effect of reducing the temperature inside the cylinder by the configuration disclosed in JP2009-197740A is restrictive, and therefore, this configuration cannot fully prevent the temperature inside the cylinder from becoming excessively high when the engine load is especially high, and a realization of such suitable compression ignition combustion may not be secured.

SUMMARY OF THE DISCLOSURE

The present disclosure is made in view of the situations, and one purpose thereof is to provide a control device for a compression ignition engine which can more securely realize suitable partial compression ignition combustion.

According to one aspect of the present disclosure, a control device for a compression ignition engine is provided, the engine including an engine body where a cylinder is formed, an intake passage where intake air introduced into the engine body circulates, an exhaust passage where exhaust gas discharged from the engine body circulates, and an exhaust gas recirculation (EGR) passage communicating the intake passage with the exhaust passage and configured to recirculate to the intake passage external EGR gas that is a portion of the exhaust gas circulating the exhaust passage. The control device includes an ignition device configured to ignite a mixture gas inside the cylinder, an EGR valve configured to open and close the EGR passage, a fuel injection device configured to supply fuel to the cylinder, and a controller comprised of circuitry connected to the ignition device, the fuel injection device, and the EGR valve, and configured to output control signals to the ignition device, the fuel injection device, and the EGR valve. The controller outputs the control signal to the ignition device so as to ignite at a timing where partial compression ignition combustion takes place in which, after a portion of the mixture gas inside the cylinder carries out jump-spark ignition combustion, the remaining mixture gas combusts by self-ignition. At least in a high-load range where the engine load is higher than a given value, within an operating range in which the partial compression ignition combustion is performed, the controller outputs the control signal to the EGR valve to open so that external EGR gas is introduced into the cylinder, and outputs the control signal to the fuel injection device so that a first injection in which fuel is injected into the cylinder at least during a period from an intake stroke to the first half of a compression stroke is carried out. While the engine body is operated in the high load range, when a torque down request for reducing the engine torque and a request for reducing an amount of the external EGR gas introduced into the cylinder are issued, the controller outputs the control signal to the EGR valve so that the opening of the EGR valve is reduced, and outputs the control signal to the fuel injection device so that a second injection in which fuel is injected into the cylinder in the second half of the compression stroke is carried out, and a ratio of an amount of the fuel of the second injection to the total amount of fuel injected into the cylinder from the fuel injection device in one combustion cycle is increased more than the ratio when the torque down is not requested.

The external EGR gas which is exhaust gas recirculated from the exhaust passage to the intake passage and the cylinder through the EGR passage is cooled by piping, etc. which constitutes the EGR passage, when passing through the EGR passage. Thus, the temperature of the external EGR gas at the time of being introduced into the cylinder is comparatively low. In this regard, in this configuration, at least in the high-load range where the engine load is higher than the given value and the temperature inside the combustion chamber tends to be high due to the high engine load, the cold external EGR gas is introduced into the cylinder. Therefore the temperature of the mixture gas inside the cylinder is prevented from becoming excessively high in the high-load range, and self-ignition of the mixture gas is possible at a suitable timing.

However, in connection with a drive delay of the EGR valve, and a time delay from the change of the opening of the EGR valve until the amount of the external EGR gas introduced into the cylinder changes, even if the opening of the EGR valve is changed, the amount of external EGR gas introduced into the cylinder does not immediately change. Thus, even when the opening of the EGR valve is reduced as the torque down request and the request for reducing the amount of the external EGR gas introduced into the cylinder are issued, the amount of external EGR gas introduced into the cylinder may not fully be reduced. Then, although the engine load became small in this way according to the torque down request, if a large amount of the cold external EGR gas is introduced into the cylinder, the temperature of the mixture gas becomes too low and an amount of inactive gas becomes excessive, and therefore, the combustion of the mixture gas may become unstable.

In this regard, when the torque down request and the request for reducing the amount of the external EGR gas introduced into the cylinder are issued, the opening of the EGR valve is reduced, the ratio of the amount of the fuel of the second injection is increased, the fuel injection is performed in the second half of the compression stroke, and also the amount of fuel to be supplied into the cylinder in the second half of the compression stroke is increased. Therefore, mixture gas with a low air-fuel ratio (A/F) (i.e., a rich mixture gas) can be formed inside the combustion chamber near a compression top dead center. Thus, this rich mixture gas can be securely combusted by being applied ignition energy, the temperature of the mixture gas can be raised, and the remaining mixture gas can also be securely self-ignited. As a result, the combustion stability is increased even immediately after the torque down request is issued, and the partial compression ignition combustion can be appropriately carried out.

The control device may further include a valve operating mechanism configured to change an amount of internal EGR gas that is burnt gas remaining in the cylinder. While the engine body is operated in the high-load range, when the torque down request for reducing the engine torque is issued, the controller may control the valve operating mechanism so that the amount of internal EGR gas decreases.

According to this configuration, the total amount of the inactive gas inside the combustion chamber can be prevented from becoming excessive immediately after the torque down request is issued and when the amount of the external EGR gas introduced into the cylinder is not sufficiently reduced, and therefore, combustion stability can be further increased.

The engine body may include an intake port communicating with the intake passage, an exhaust port communicating with the exhaust passage, an intake valve configured to open and close the intake port, an exhaust valve configured to open and close the exhaust port, and the valve operating mechanism configured to drive at least one of the intake valve and the exhaust valve. The valve operating mechanism may reduce the amount of internal EGR gas by driving the at least one of the intake valve and the exhaust valve so that a valve overlap period that is a period when an open period of the intake valve and an open period of the exhaust valve overlap with each other is reduced.

According to this configuration, with the simple configuration of reducing the valve overlap period of the intake valve and the exhaust valve, the amount of internal EGR gas is reduced at an early stage immediately after the torque down request is issued.

The engine body may be mounted on a vehicle provided with a transmission configured to perform a speed-to-torque conversion of rotation of the engine body and transmit the converted rotation to wheels of the vehicle. When the torque down request is issued in association with a change in the gear stage of the transmission, the controller may reduce the opening of the EGR valve, and increase the ratio of the amount of the fuel of the second injection to the total amount of fuel injected into the cylinder from the injector in one combustion cycle.

BRIEF DESCRIPTION OF DRAWINGS

FIG. 8A is a pattern during a steady operation in a first operating range, and FIG. 8B is a pattern during a torque down in the first operating range.

FIG. 9A is a pattern during a steady operation in a second operating range, and FIG. 9B is a pattern during a torque down in the second operating range.

DETAILED DESCRIPTION OF THE DISCLOSURE (1) Overall Configuration of Engine

Figure 1:
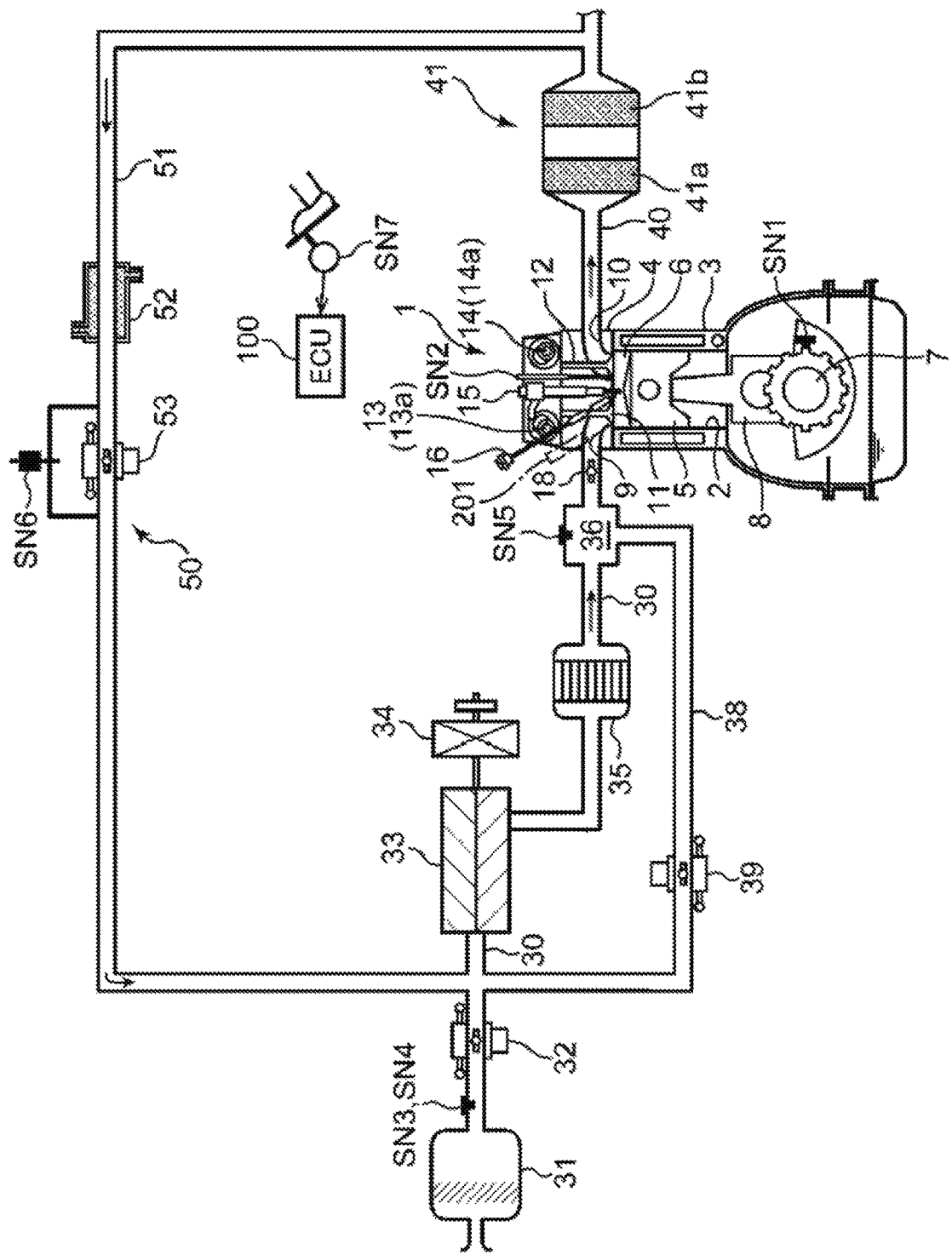
FIG. 1 is a system diagram schematically illustrating the overall configuration of an engine according to one embodiment of the present disclosure.

FIG. 1 is a view illustrating a preferable embodiment of an engine to which a control device of the present disclosure is applied. The engine illustrated in this figure is a four-cycle gasoline direct-injection engine mounted on a vehicle, as a propelling source, and includes an engine body 1, an intake passage 30 where intake air introduced into the engine body 1 circulates, an exhaust passage 40 where exhaust gas discharged from the engine body 1 circulates, and an exhaust gas recirculation (EGR) device 50 which recirculates to the intake passage 30 a part of the exhaust gas flowing through the exhaust passage 40.

The engine body 1 has a cylinder block 3 where cylinders 2 are formed therein, a cylinder head 4 attached to an upper surface of the cylinder block 3 so as to cover up the cylinders 2 from above, and pistons 5 inserted in the respective cylinder 2 so as to reciprocate. Although the engine body 1 is, typically, a multi cylinder type having a plurality of cylinders (e.g., four cylinders lined up in a direction perpendicular to the drawing sheet of FIG. 1), one cylinder 2 is focused here for simplifying the description.

A combustion chamber 6 is defined above the piston 5, and fuel is supplied to the combustion chamber 6 by an injection from an injector 15 (described later). Then, the supplied fuel combusts while being mixed with air inside the combustion chamber 6, and the piston 5 depressed by an expanding force produced by the combustion reciprocates in the vertical direction. Note that the fuel injected into the combustion chamber 6 is fuel which contains gasoline as the main component. This fuel may also contain a secondary component, such as bioethanol, in addition to gasoline. This injector 15 is capable of injecting the fuel into the combustion chamber 6 in a plurality of steps, as will be described later. This injector 15 is one example of a "fuel injection device" in the present disclosure.

Below the piston 5, a crankshaft 7 which is an output shaft of the engine body 1 is provided. The crankshaft 7 is coupled to the piston 5 through a connecting rod 8, and is rotated on its center axis in connection with the reciprocating motion (vertical motion) of the piston 5.

A geometric compression ratio of the cylinder 2, i.e., a ratio of a volume of a combustion chamber when the piston 5 is located at a bottom dead center to a volume of the combustion chamber 6 when the piston 5 is located at a top dead center is set as 13:1 or higher and 30:1 or lower, as a suitable value for SPCCI combustion (partial compression ignition combustion) described later. In more detail, the geometric compression ratio of the cylinder 2 is preferably set as 14:1 or higher and 17:1 or lower in a regular gasoline type which uses gasoline fuel of which the octane number is about 91, and is set 15:1 or higher and 18:1 or lower in the high octane type which uses gasoline fuel of which the octane number is about 96.

The cylinder block 3 is provided with a crank angle sensor SN1 which detects a rotation angle of the crankshaft 7 (crank angle) and a rotating speed of the crankshaft 7 (engine speed).

The cylinder head 4 is provided with intake ports 9 and exhaust ports 10 which open to the combustion chamber 6, intake valves 11 which open and close the intake ports 9, and exhaust valves 12 which open and close the exhaust ports 10. Note that the valve type of the engine in this embodiment is four-valve type comprised of two intake valves and two exhaust valves, and two intake ports 9, two exhaust ports 10, two intake valves 11, and two exhaust valves 12 are provided to each cylinder 2. In this embodiment, a swirl valve 18 which can be opened and closed is provided to one of the two intake ports 9 connected to one cylinder 2, and the intensity of the swirl flow (a revolving flow which circles around the cylinder axis) inside the cylinder 2 is changed.

The intake valve 11 and the exhaust valve 12 are opened and closed by respective valve operating mechanisms 13 and 14 including a pair of cam shafts disposed in the cylinder head 4 in an interlocked manner with the rotation of the crankshaft 7.

Figure 2:
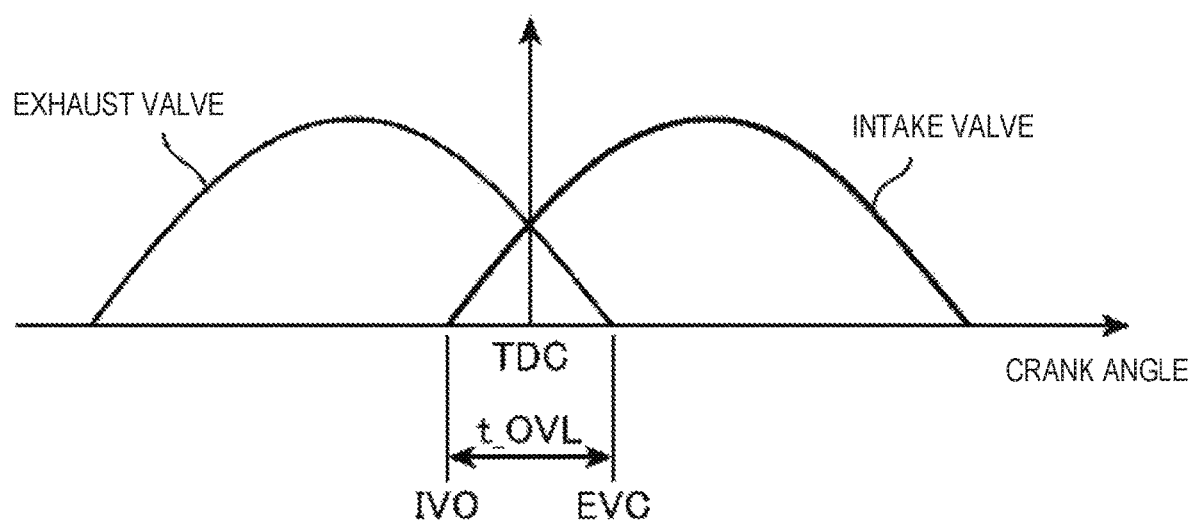
FIG. 2 is a graph illustrating valve lifts of an intake valve and an exhaust valve.

An intake VVT 13a is built inside the valve operating mechanism 13 for the intake valve 11, which is capable of changing at least an open timing of the intake valve 11. Similarly, an exhaust VVT 14a is built inside the valve operating mechanism 14 for the exhaust valve 12, which is capable of changing at least a close timing of the exhaust valve 12. By a control of the intake VVT 13a and the exhaust VVT 14a, as illustrated in FIG. 2, a valve overlap is realized in which, when an open timing IVO of the intake valve 11 is advanced exceeding a close timing EVC of the exhaust valve 12, the open period of the intake valve 11 and the open period of the exhaust valve 12 are overlapped to open both the intake valve 11 and the exhaust valve 12 for a given period of time. Then, by changing at least one of the open timing IVO of the intake valve 11 and the close timing EVC of the exhaust valve 12, a valve overlap period t_VOL which is a period of the valve overlap (a period during which the open period of the intake valve 11 and the open period of the exhaust valve 12 are overlapped with each other) is changed. Note that the intake VVT 13a (exhaust VVT 14a) may be a variable mechanism of a type which changes only the close timing (open timing) while maintaining the open timing (close timing) of the intake valve 11 (exhaust valve 12), or may be a variable mechanism of a phase type which changes the open timing and the close timing of the intake valve 11 (exhaust valve 12) simultaneously. The valve operating mechanism 13 for the intake valve 11 and the valve operating mechanism 14 for the exhaust valve 12 are examples of an "internal EGR amount changing device" in the present disclosure.

The cylinder head 4 is provided with the injector 15 which injects fuel (mainly gasoline) into the combustion chamber 6, and an ignition plug 16 which ignites a mixture gas comprised of the fuel injected into the combustion chamber 6 from the injector 15 and air introduced into the combustion chamber 6. The cylinder head 4 is also provided with an in-cylinder pressure sensor SN2 which detects an in-cylinder pressure which is the pressure inside the combustion chamber 6.

The injector 15 is an injector of a multiple injection hole type having a plurality of injection holes at a tip-end part thereof, and is capable of injecting fuel radially from the plurality of injection holes. The injector 15 is provided so that the tip-end part thereof opposes to a central part of a crown surface of the piston 5. Note that although illustration is omitted, in this embodiment, a cavity is formed in the crown surface of the piston 5, where a comparatively large area including the central part is dented to the opposite side (downward) from the cylinder head 4.

The ignition plug 16 is disposed at a position slightly offset from the injector 15 to the intake side. The ignition plug 16 corresponds to an "ignition device" in the present disclosure.

The intake passage 30 is connected to one side surface of the cylinder head 4 so as to communicate with the intake ports 9. Air (fresh air) taken in from an upstream end of the intake passage 30 is introduced into the combustion chamber 6 through the intake passage 30 and the intake ports 9.

The intake passage 30 is provided with an air cleaner 31 which removes foreign substances in intake air, a throttle valve 32 which can be opened and closed to adjust a flow rate of the intake air, a supercharger 33 which pumps the intake air while compressing the intake air, an intercooler 35 which cools the intake air compressed by the supercharger 33, and a surge tank 36, in this order from the upstream side.

An airflow sensor SN3 which detects a flow rate of intake air, an intake air temperature sensor SN4 which detects the temperature of the intake air, and an intake pressure sensor SN5 which detects the pressure of the intake air are provided to respective parts of the intake passage 30. The airflow sensor SN3 and the intake air temperature sensor SN4 are provided to a part of the intake passage 30 between the air cleaner 31 and the throttle valve 32, and detect the flow rate and the temperature of intake air which passes through this part. The intake pressure sensor SN5 is provided to the surge tank 36, and detects the pressure of intake air inside the surge tank 36.

The supercharger 33 is a mechanical supercharger which is mechanically coupled to the engine body 1. Although the type of the supercharger 33 may be any types, and, for example, any one of known superchargers, such as a Lysholm type, a Root type, and a centrifugal type, may be used as the supercharger 33. Between the supercharger 33 and the engine body 1, an electromagnetic clutch 34 which is capable of electrically switching between engage and disengage is provided. When the electromagnetic clutch 34 is engaged, the driving force is transmitted to the supercharger 33 from the engine body 1, and boosting of the supercharger 33 is performed. On the other hand, when the electromagnetic clutch 34 is disengaged, the transmission of the driving force is intercepted, and the boosting of the supercharger 33 is suspended.

A bypass passage 38 for bypassing the supercharger 33 is provided to the intake passage 30. The bypass passage 38 connects the surge tank 36 with an EGR passage 51 (described later). A bypass valve 39 which can be opened and closed is provided to the bypass passage 38. The bypass valve 39 is a valve for adjusting the pressure of intake air introduced into the surge tank 36 (i.e., boosting pressure). For example, as the opening of the bypass valve 39 increases, a flow rate of intake air which flows backwards to the upstream side of the supercharger 33 through the bypass passage 38 increase, and, as a result, the boosting pressure is lowered.

The exhaust passage 40 is connected to the other side surface of the cylinder head 4 so as to communicate with the exhaust ports 10. Burnt gas generated inside the combustion chamber 6 (exhaust gas) is discharged outside through the exhaust ports 10 and the exhaust passage 40.

A catalytic converter 41 is provided to the exhaust passage 40. A three-way catalyst 41a and a GPF (Gasoline Particulate Filter) 41b are built inside the catalytic converter 41, in this order from the upstream side.

The EGR device 50 has the EGR passage 51 which communicates the exhaust passage 40 with the intake passage 30, and an EGR cooler 52 and an EGR valve 53 provided to the EGR passage 51. The EGR passage 51 connects a part of the exhaust passage 40 downstream of the catalytic converter 41 with a part of the intake passage 30 between the throttle valve 32 and the supercharger 33. The EGR cooler 52 cools, by heat exchange, external EGR gas which is exhaust gas recirculated from the exhaust passage 40 to the intake passage 30 through the EGR passage 51. The EGR valve 53 is provided to the EGR passage 51 downstream of the EGR cooler 52 (closer to the intake passage 30) so as to be openable and closable, and adjusts a flow rate of exhaust gas which circulates the EGR passage 51.

A pressure difference sensor SN6 which detects a difference between the pressure upstream of the EGR valve 53 and the pressure downstream of the EGR valve 53 is provided to the EGR passage 51.

(2) Control System

Figure 3:
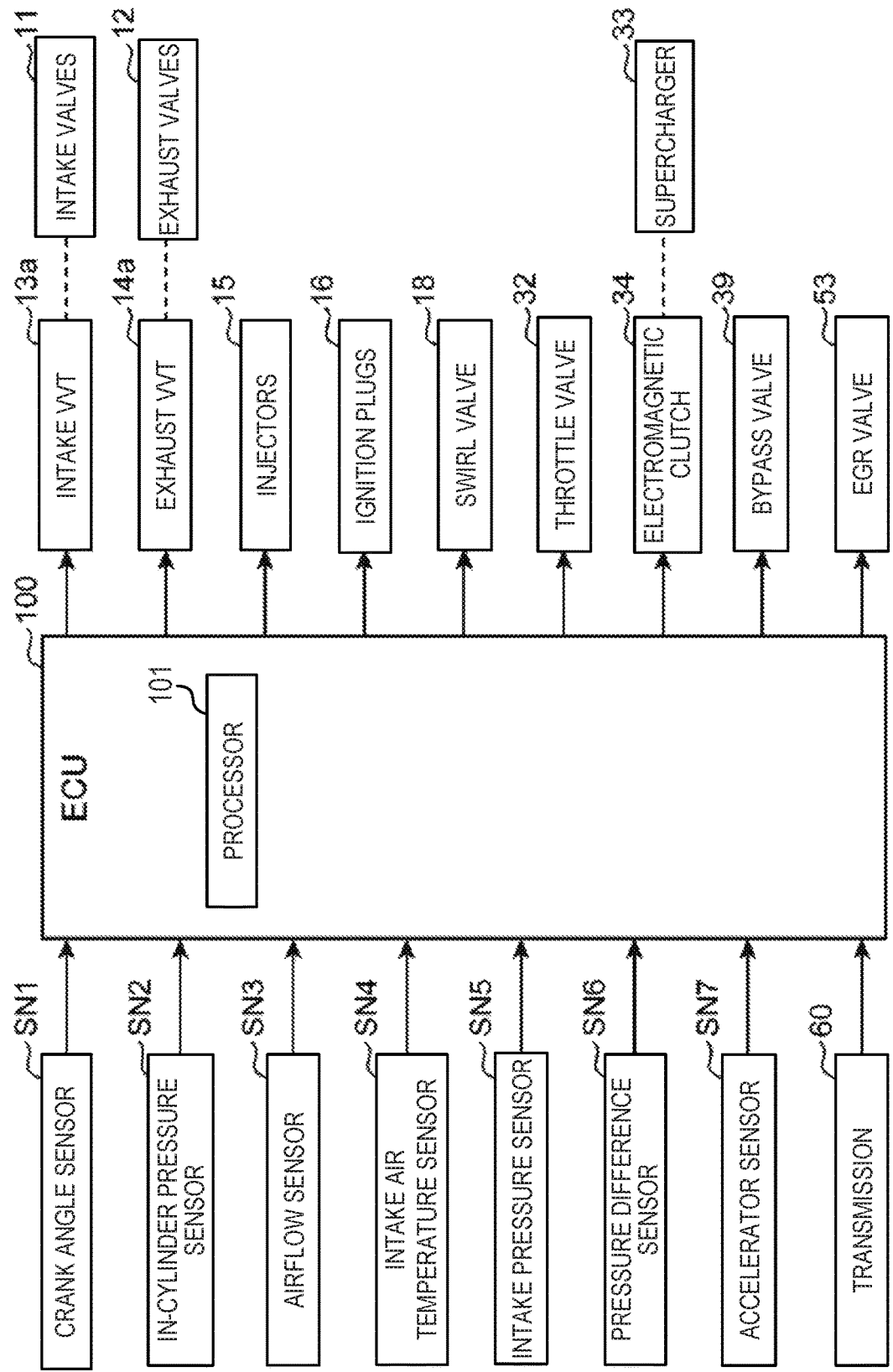
FIG. 3 is a block diagram illustrating a control system of the engine.

FIG. 3 is a block diagram illustrating a control system of the engine. An ECU (electronic control unit) 100 illustrated in this figure is a microcontroller for comprehensively controlling the engine, and is comprised of a processor 101 (e.g., a central processing unit (CPU)) having associated ROM and RAM, etc., which are well known in the art.

Detection signals of various sensors are inputted into the ECU 100. For example, the ECU 100 is electrically connected to the crank angle sensor SN1, the in-cylinder pressure sensor SN2, the airflow sensor SN3, the intake air temperature sensor SN4, the intake pressure sensor SN5, and the pressure difference sensor SN6, which are described above. Information detected by these sensors, such as a crank angle, an engine speed, an in-cylinder pressure, an intake air flow rate, an intake air temperature, an intake pressure, and a pressure difference between locations before and after the EGR valve 53, are sequentially inputted into the ECU 100. Moreover, an accelerator sensor SN7 which detects an opening of an accelerator pedal operated by a driver who operates the vehicle is provided to the vehicle. A detection signal of the accelerator sensor SN7 is also inputted into the ECU 100.

The ECU 100 controls each part of the engine, while performing various determinations, calculations, etc. based on the input signals from the sensors. That is, the ECU 100 is electrically connected to the intake VVT 13a, the exhaust VVT 14a, the injector 15, the ignition plug 16, the swirl valve 18, the throttle valve 32, the electromagnetic clutch 34, the bypass valve 39, the EGR valve 53, etc., and outputs control signals to these devices based on the results of the calculation, etc. This ECU 100 is an example of a "controller" in the present disclosure.

(3) Basic Control

Figure 4:
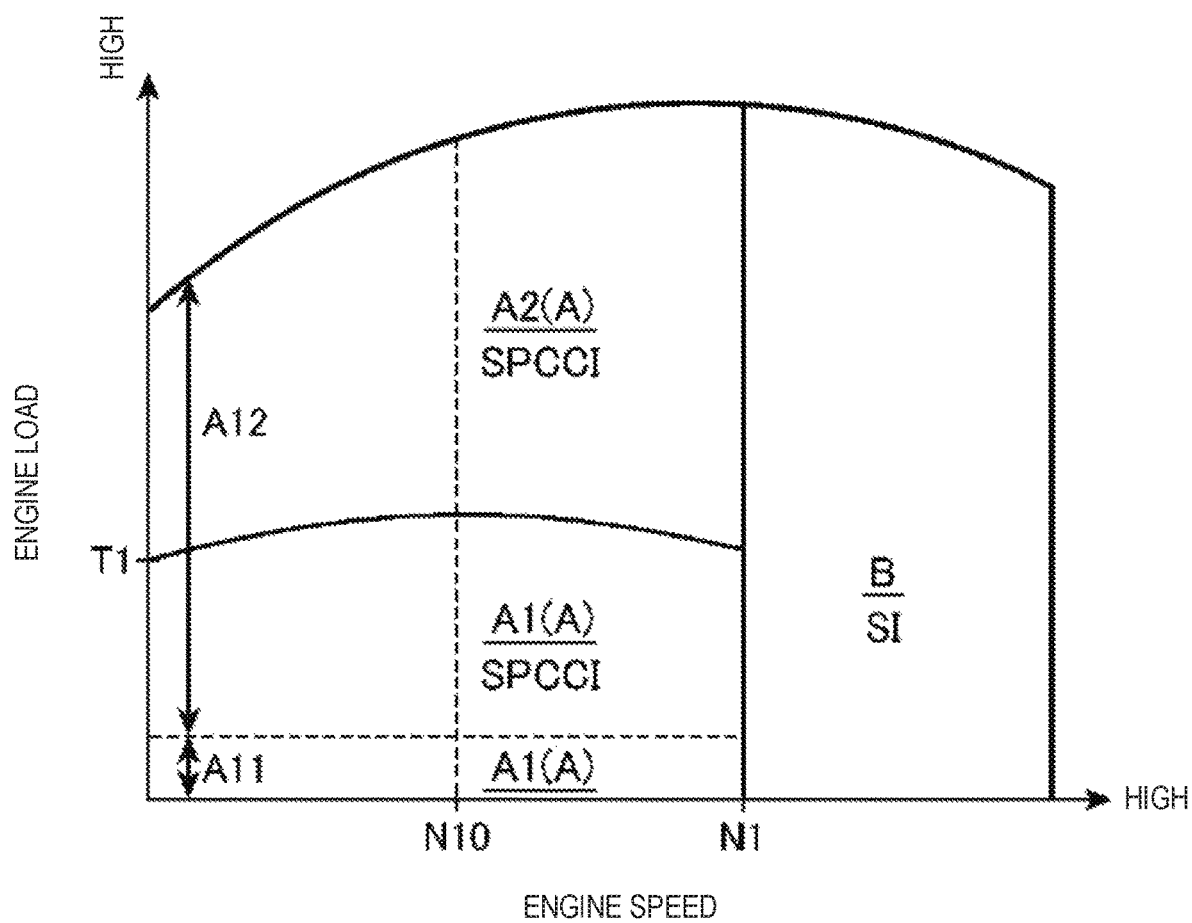
FIG. 4 is a map where an engine operating range is classified by differences in a combustion mode.

FIG. 4 is a map illustrating a difference of the control according to the engine speed and the engine load. As illustrated in this figure, an engine operating range is roughly divided into three operating ranges A1, A2, and B. The first operating range A1 is a low-speed low-load range where the engine speed is lower than a given reference speed N1 and the engine load is lower than a given reference load T1, and the second operating range A2 is a low-speed high-load range where the engine speed is lower than the reference speed N1 and the engine load is the reference load T1 or higher, and the third operating range B is a high-speed range where the engine speed is the reference speed N1 or higher. The ECU 100 determines which operating range among the first to third operating ranges A1-B the present operation point falls based on the engine speed and the engine load which are detected by the crank angle sensor SN1, and carries out a control described below. Note that the ECU 100 calculates the engine load based on the opening of the accelerator pedal detected by the accelerator sensor SN7, the engine speed, etc.

(3-1) First Operating Range A1 and Second Operating Range A2

In the first operating range A1 and the second operating range A2, compression ignition combustion in which spark ignition (SI) combustion and compression ignition (CI) combustion are mixed (hereinafter, referred to as "SPCCI combustion") is performed. Note that "SPCCI" in SPCCI combustion is an abbreviation for "SPark Controlled Compression Ignition."

SI combustion is a combustion mode in which the mixture gas is ignited by the ignition plug 16 and the mixture gas is forcibly combusted by flame propagation which extends its combustion range from an igniting point to the perimeter. CI combustion is a combustion mode in which the mixture gas is combusted by self-ignition under a high-temperature and high-pressure environment which is created according to compression by the piston 5. Further, SPCCI combustion in which SI combustion and CI combustion are mixed is a combustion mode in which SI combustion of a portion of the mixture gas inside the combustion chamber 6 is carried out by a jump-spark ignition which is performed under an environment just before the mixture gas self-ignites, and CI combustion of the remaining mixture gas inside the combustion chamber 6 is carried out by self-ignition after the SI combustion (by a further increase in the temperature and the pressure accompanying the SI combustion).

Figure 5:
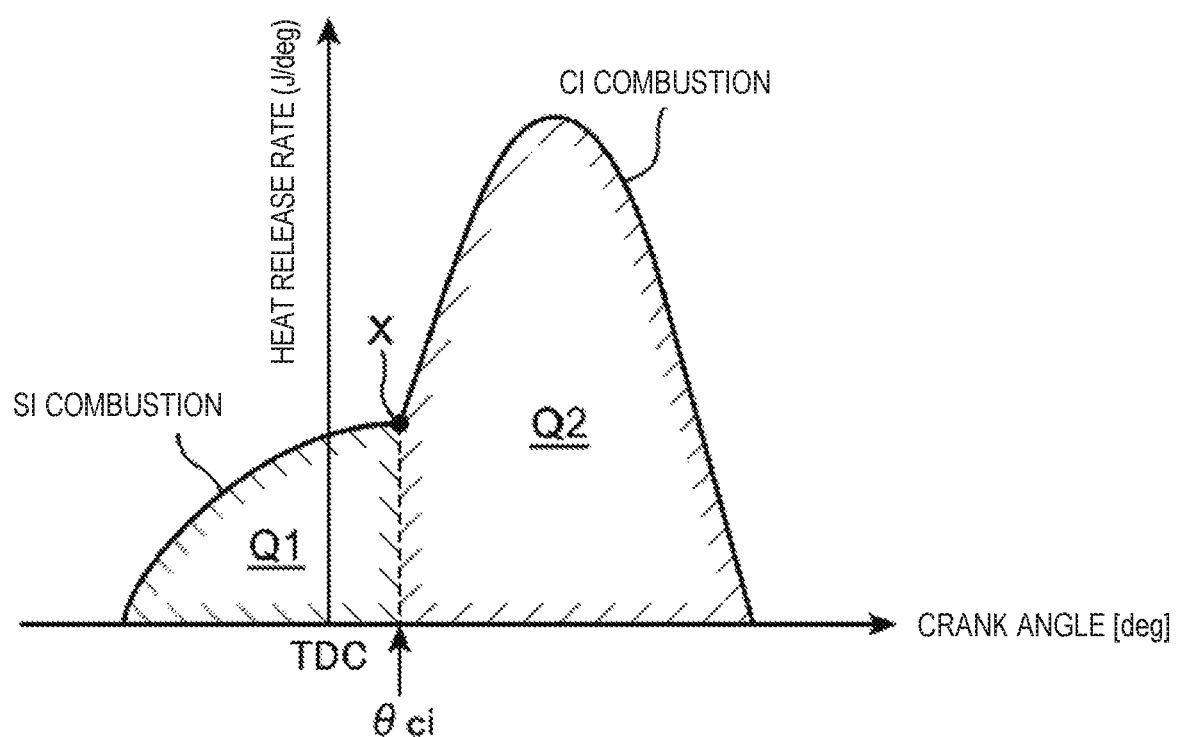
FIG. 5 is a graph illustrating a waveform of a rate of heat release during SPCCI combustion (partial compression ignition combustion).

FIG. 5 is a graph illustrating a change in the rate of heat release (J/deg) with respect to the crank angle when SPCCI combustion occurs. In SPCCI combustion, the heat release during SI combustion becomes lower than the heat release during CI combustion. For example, as for a waveform of the rate of heat release when SPCCI combustion is performed, its rising slope becomes relatively shallow, as illustrated in FIG. 5. Moreover, a pressure fluctuation in the combustion chamber 6 (i.e., dP/dθ, where P is an in-cylinder pressure and θ is a crank angle) also becomes lower during SI combustion than CI combustion. In other words, the waveform of the rate of heat release during SPCCI combustion is formed so that a first heat release rate part (a part illustrated by Q1) where a rising slope formed by SI combustion is relatively shallow, and a second heat release rate part (a part illustrated by Q2) where the rising slope formed by CI combustion is relatively steep, are continuous in this order.

When the temperature and the pressure inside the combustion chamber 6 are increased by SI combustion, unburnt mixture gas self-ignites in connection with this, and, therefore, CI combustion takes place. As illustrated in FIG. 5, the slope of the waveform of the rate of heat release changes from shallow to steep at the timing of this self-ignition (i.e., the timing at which CI combustion starts). That is, the waveform of the rate of heat release during SPCCI combustion has a point of inflection (indicated by an "X" in FIG. 5) which appears at a timing θci where CI combustion starts.

After the start of CI combustion, SI combustion and CI combustion are performed in parallel. In CI combustion, since the heat release is larger than that of SI combustion, the rate of heat release becomes relatively high. However, since CI combustion is performed after a compression top dead center, the slope of the waveform of the rate of heat release will not become excessive. That is, since the motoring pressure falls by the descent of the piston 5 after the compression top dead center, this suppresses the rise of the rate of heat release, and, as a result, dP/dθ during CI combustion is avoided from becoming excessive. Thus, in SPCCI combustion, dP/dθ used as the index of combustion noise is unlikely to become excessive because of the nature of CI combustion being performed after SI combustion, and combustion noise can be reduced compared with simple CI combustion (when CI combustion of all the fuel is carried out).

SPCCI combustion also ends with the end of CI combustion. Since CI combustion is quicker in a combusting rate than SI combustion, it can bring the end time of the combustion earlier than the simple SI combustion (when SI combustion of all the fuel is carried out). In other words, SPCCI combustion can bring the end timing of the combustion closer to a compression top dead center within an expansion stroke. Therefore, SPCCI combustion can improve fuel efficiency compared with the simple SI combustion.

(a) First Operating Range A1

In the first operating range A1 where the load is low among the range where SPCCI combustion is performed, the air-fuel ratio (A/F) inside the combustion chamber 6 is made higher (leaner) than a stoichiometric air-fuel ratio, in order to improve fuel efficiency. In this embodiment, in the first operating range A1, the air-fuel ratio inside the combustion chamber 6 is increased so that an amount of raw $NO_x$ which is $NO_x$ generated inside the combustion chamber 6 becomes small enough. For example, in the first operating range A1, the air-fuel ratio inside the combustion chamber 6 is made to about 30:1.

In the first operating range A1, the injector 15 injects into the combustion chamber 6 such an amount of fuel that the air-fuel ratio (A/F) inside the combustion chamber 6 becomes the high value as described above. In this embodiment, the injector 15 is driven so that the entire amount of fuel to be supplied to the combustion chamber 6 in one cycle is injected into the combustion chamber 6 in an intake stroke. For example, the entire amount of fuel is injected into the first half of an intake stroke.

In the first operating range A1, the throttle valve 32 is fully opened.

In the first operating range A1, the ignition plug 16 ignites the mixture gas near a compression top dead center. SPCCI combustion starts triggered by this ignition, a portion of the mixture gas inside the combustion chamber 6 combusts by flame propagation (SI combustion), and the remaining mixture gas then combusts by self-ignition (CI combustion).

In the first operating range A1, the opening of the EGR valve 53 is controlled so that a target external EGR rate which is a target value of the external EGR rate becomes larger as the engine load increases. The external EGR rate is a ratio of the mass of the external EGR gas to the mass of air inside the combustion chamber 6, and it is a value calculated by Regr=Megr/Ma when the external EGR rate is Regr, the mass of the air inside the combustion chamber 6 is Ma, and the mass of the external EGR gas is Megr.

Figure 6:
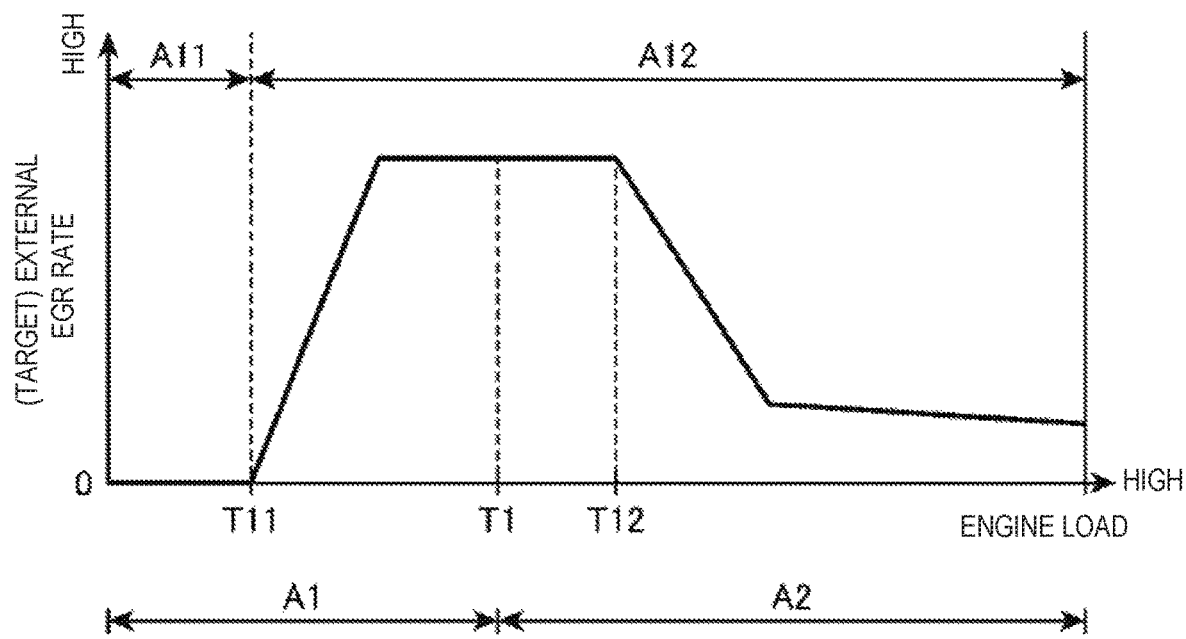
FIG. 6 is a graph illustrating a relationship between an engine load and an external EGR rate during a steady operation.

FIG. 6 is a graph illustrating a relationship between the engine load and the target external EGR rate when the engine speed becomes a given engine speed N10 (see FIG. 4) lower than the reference speed N1. As illustrated in this graph, in this embodiment, the target external EGR rate is set to zero in a partial range of the first operating range A1 where the engine load is below a given first load T11. Therefore, in this partial range, the EGR valve 53 is closed, and the introduction of the external EGR gas into the combustion chamber 6 is suspended. On the other hand, the target external EGR rate is set to a value larger than zero in a partial range of the first operating range A1 where the engine load is the first load T11 or higher. Therefore, in this range, the EGR valve 53 is opened and the external EGR gas is introduced in the combustion chamber 6. Moreover, in this range, the target external EGR rate is set to a larger value as the engine load increases, and the amount of external EGR gas introduced into the combustion chamber 6 is increased as the engine load increases. For example, the target external EGR rate is set to about 30% at the high-load side in the first operating range A1.

In the first operating range A1, the intake VVT 13a and the exhaust VVT 14a set the open timings and the close timings (i.e., these are comprehensively referred to as "the open-and-close timing(s)") of the intake valve 11 and the exhaust valve 12 at timings where the valve overlap in which the open period of the intake valve 11 and the open period of the exhaust valve 12 overlap with each other occurs. In this embodiment, as illustrated in FIG. 2, these open-and-close timings are set so that both the intake valve 11 and the exhaust valve 12 are opened over an exhaust top dead center (TDC). In the first operating range A1, since the engine load is low and the speed of intake air introduced into the combustion chamber 6 is low, if the intake and exhaust valves 11 and 12 are opened and closed so as to achieve the valve overlap, the internal EGR where hot burnt gas remains in the combustion chamber 6 is realized.

Figure 7:
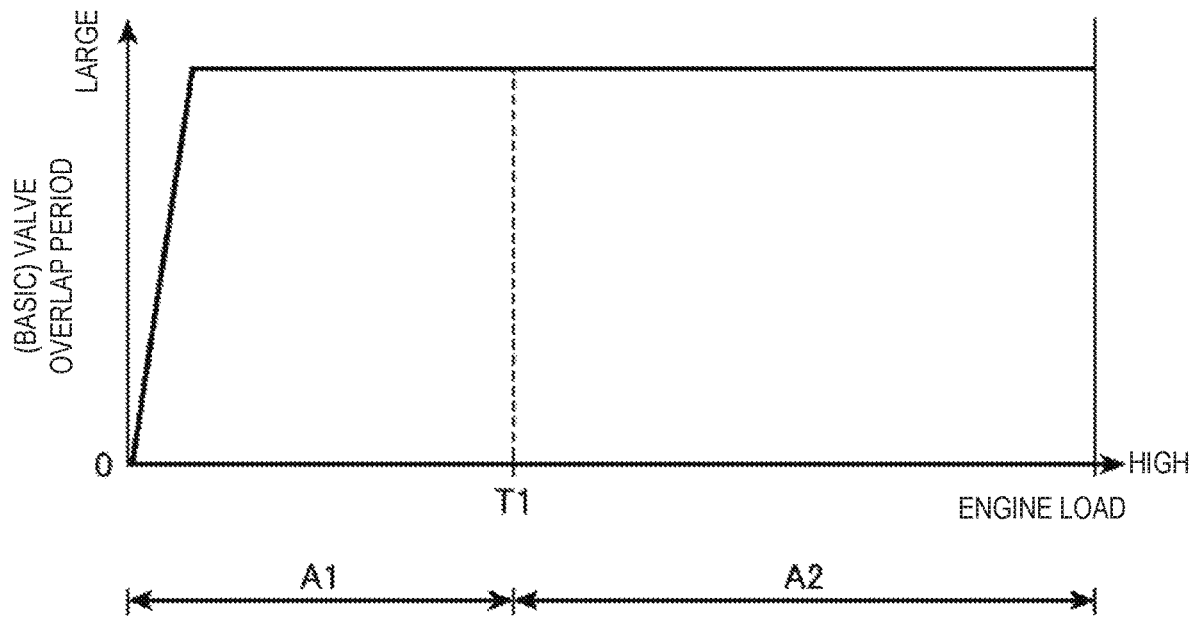
FIG. 7 is a graph illustrating a relationship between the engine load and a valve overlap period of intake and exhaust valves during the steady operation.

FIG. 7 is a graph illustrating a relationship between the engine load and the valve overlap period t_VOL when the engine speed becomes the given speed N10. As illustrated in this graph, in this embodiment, although the valve overlap period t_VOL is lengthened as the engine load increases in a partial range of the first operating range A1 where the engine load is very low, the valve overlap period t_VOL is set to a comparatively large value and is kept substantially constant regardless of the engine load in other ranges. In the example of FIG. 7, when the engine load is the minimum in the first operating range A1, the valve overlap period t_VOL is set to substantially zero. For example, in a partial range of the first operating range A1 where the engine load is high, the open timing of the intake valve 11 is set to about 30° CA (crank angle) before a compression top dead center (TDC), the close timing of the exhaust valve 12 is set to 30° CA after the compression top dead center, and the valve overlap period t_VOL is set to 60° CA at the most.

In the first operating range A1, the swirl valve 18 is fully closed or closed to a narrow opening which is near fully closed. Therefore, a strong swirl flow is formed inside the combustion chamber 6.

The supercharger 33 is suspended at the lower engine speed side in the first operating range A1. That is, the electromagnetic clutch 34 is disengaged to release the coupling of the supercharger 33 to the engine body 1, and by fully opening the bypass valve 39, the boosting of the supercharger 33 is suspended. On the other hand, at the higher engine speed side in the first operating range A1, the supercharger 33 operates. That is, the boosting of the supercharger 33 is performed by engaging the electromagnetic clutch 34 to couple the supercharger 33 to the engine body 1. At this time, the opening of the bypass valve 39 is controlled so that the pressure inside the surge tank 36 detected by the intake pressure sensor SN5 (boosting pressure) becomes in agreement with the target pressure defined beforehand for every operating condition (the engine speed and the engine load).

(b) Second Operating Range A2

The second operating range A2 is a range where the engine load is higher and the amount of fuel supplied to the combustion chamber 6 is larger than those in the first operating range A1. Therefore, in the second operating range A2, it becomes difficult to increase the air-fuel ratio inside the combustion chamber 6. For this reason, in the second operating range A2, the air-fuel ratio inside the combustion chamber 6 is set to near a stoichiometric air-fuel ratio. Note that when the air-fuel ratio is set comparatively high, the amount of $NO_x$ generated inside the combustion chamber 6 tends to increase, but, since the air-fuel ratio inside the combustion chamber 6 is thus set near the stoichiometric air-fuel ratio, the generated $NO_x$ can be appropriately purified in the three-way catalyst 41a, thereby keeping the discharged amount of $NO_x$ from the vehicle low.

In the second operating range A2, the injector 15 injects into the combustion chamber 6 such an amount of fuel that the air-fuel ratio becomes near the stoichiometric air-fuel ratio as described above. In this embodiment, the large portion of the fuel to be injected into one cycle is injected in an intake stroke, and the remaining fuel is injected in a compression stroke.

Also in the second operating range A2, the throttle valve 32 is fully opened.

Also in the second operating range A2, the ignition plug 16 ignites the mixture gas near a compression top dead center. Also in the second operating range A2, SPCCI combustion is started triggered by this ignition, the portion of the mixture gas inside the combustion chamber 6 combusts by flame propagation (SI combustion), and the remaining mixture gas then combusts by a self-ignition (CI combustion).

In the second operating range A2, the opening of the EGR valve 53 is controlled so that the amount of external EGR gas introduced into the combustion chamber 6 decreases as the load increases. In detail, as illustrated in FIG. 6, in a partial range of the second operating range A2 where the engine load is lower than a given second load T12, the target external EGR rate is set to a value equivalent to the maximum value in the first operating range A1. Therefore, in this partial range, the opening of the EGR valve 53 is made comparatively large to introduce a large amount of external EGR gas into the combustion chamber 6. On the other hand, in a partial range of the second operating range A2 where the engine load is the second load T12 or higher, the target external EGR rate is made smaller as the engine load increases. However, in this embodiment, the target external EGR rate is set to a value larger than zero in the entire second operating range A2, and the EGR valve 53 is opened in the entire second operating range A2. For example, the target external EGR rate is set to about 30% at the lower load side in the second operating range A2, and the target external EGR rate is set to about 10% at the operation point of the second operating range A2 where the engine load becomes the maximum.

Thus, in this embodiment, in a range A where SPCCI combustion is carried out, the EGR valve 53 is closed in a range A11 where the engine load is lower than the first load T11. On the other hand, in the range A where SPCCI combustion is carried out, the EGR valve 53 is opened in a range A12 where the engine load is the first load T11 or higher. Below, the range including the first operating range A1 and the second operating range A2 where SPCCI combustion is carried out is suitably referred to as the "SPCCI range A." Moreover, a partial range of the SPCCI range A where the engine load is the first load T11 or higher and the EGR valve 53 is opened is referred to as the "EGR open range A12." The first load T11 is an example of a "given value" in the present disclosure, and the EGR open range A12 is an example of a "high-load range" in the present disclosure.

Also in the second operating range A2, the open-and-close timings of the intake valve 11 and the exhaust valve 12 are set as timings at which the valve overlap in which the open period of the intake valve 11 and the open period of the exhaust valve 12 overlap with each other occurs. In this embodiment, such open-and-close timings are set so that both the intake valve 11 and the exhaust valve 12 are opened over the exhaust top dead center.

In the second operating range A2, the open timing of the intake valve 11 and the close timing of the exhaust valve 12 are substantially fixed, regardless of the engine load, and therefore, as illustrated in FIG. 7, the valve overlap period t_VOL is kept substantially constant, regardless of the engine load. In this embodiment, the valve overlap period t_VOL in the second operating range A2 is set to a value substantially the same as the maximum value of the valve overlap period t_VOL in the first operating range A1 (e.g., 60° CA).

Also in the second operating range A2, the internal EGR where hot burnt gas remains inside the combustion chamber 6 is realized by opening and closing the intake and exhaust valves 11 and 12 so that the valve overlap is produced, similar to the first operating range A1.

In the second operating range A2, the swirl valve 18 is opened to a suitable intermediate opening other than fully closed and fully opened, and the opening is made larger as the engine load increases.

The supercharger 33 is suspended at a side of the second operating range A2 where both the engine speed and the engine load are low. On the other hand, the supercharger 33 operates in other ranges in the second operating range A2.

(3-2) Third Operating Range B

In the third operating range B, relatively orthodox SI combustion is performed. In order to realize this SI combustion, in the third operating range B, the injector 15 injects fuel over a given period of time which at least overlaps with an intake stroke. The ignition plug 16 ignites the mixture gas near a compression top dead center. In the third operating range B, SI combustion is started triggered by this ignition, and the entire mixture gas inside the combustion chamber 6 combusts by flame propagation.

In the third operating range B, the supercharger 33 operates. The throttle valve 32 is fully opened. The valve opening of the EGR valve 53 is controlled so that the air-fuel ratio (A/F) inside the combustion chamber 6 becomes a stoichiometric air-fuel ratio or slightly richer than the stoichiometric air-fuel ratio. On the other hand, a gas-fuel ratio inside the combustion chamber 6 (G/F: the total gas mass inside the combustion chamber 6 to a fuel mass) is lean (higher than a stoichiometric air-fuel ratio) excluding near the highest load engine. The swirl valve 18 is fully opened.

(4) Control During Torque Down Request

The contents described in the above section (3-1) are the contents of the control when the steady operation is performed in the first operating range A1 and the second operating range A2, i.e., when each parameter is stable. On the other hand, below, a control when a torque down request is issued in the range where SPCCI combustion is carried out including the first operating range A1 and the second operating range A2 (hereinafter, suitably referred to as the "SPCCI range A") and the engine load is reduced is described.

The torque down request is issued to the ECU 100, for example, from a transmission 60 (see FIG. 3) provided to the vehicle. In detail, in this embodiment, the engine body 1 is mounted on the vehicle provided with the transmission 60 of a multi-stage type which reduces the rotation of the engine body 1 and transmits the reduced rotation to the wheels. In such a vehicle, when an upshift for changing the gear from a lower gear (stage or position) to a higher gear (stage or position) is performed, the engine torque is temporarily reduced. In this embodiment, a control device for gear change which controls the transmission 60 (not illustrated) and an operating mechanism, such as a shift lever which allows a driver of the vehicle to operate the transmission 60 are mounted on the vehicle. When the driver operates the operating mechanism to upshift, the control device for gear change determines that there is a request for an upshift, and instructs the ECU 100 to reduce the engine torque. When the instruction is received, the ECU 100 determines that there is the torque down request. Note that the timing of issuing the torque down request is not limited to when the upshift is requested. For example, in a vehicle provided with a traction control system for preventing a wheel slip, this system requests the torque down to the ECU 100 in order to prevent the wheel slip. Moreover, it may be determined that the torque down is requested also when there is a slowdown of the vehicle.

As described above, in the SPCCI range A, the target external EGR rate is changed according to the engine load, and the EGR valve 53 is driven so as to realize the target external EGR rate. However, there is a response delay in the EGR valve 53. That is, it takes time for the opening of the EGR valve 53 to actually be changed by the instructed opening after the ECU 100 instructs the opening change to the EGR valve 53. Moreover, the external EGR gas is introduced into the combustion chamber 6 through the exhaust passage 40, the EGR passage 51, and the intake passage 30, and therefore, even if the flow rate of exhaust gas inside the exhaust passage 40 changes with the change in the engine load, and even if the opening of the EGR valve 53 changes, it takes time for the amount of external EGR gas introduced into the combustion chamber 6 to be changed.

Thus, when the engine is operated in an EGR open range A12, i.e., in a partial range A12 of the SPCCI range A where the engine load is the first load T11 or higher, and the torque down request is issued in the state where the EGR valve 53 is opened, even if the opening of the EGR valve 53 is changed in order to reduce the amount of external EGR gas, the amount of external EGR gas may not fully be reduced to a desired value. Then, although the engine load became small in this way according to the torque down request, if a large amount of cold external EGR gas is introduced into the combustion chamber 6, the temperature of the mixture gas may become too low and combustion of the mixture gas may become unstable.

Thus, in this embodiment, when the torque down request is issued while the engine is operated in the EGR open range A12, and there is a request for reducing the amount of external EGR gas, a portion of fuel to be supplied into the combustion chamber 6 in one combustion cycle is injected into the combustion chamber 6 from the injector 15 in the second half of the compression stroke, in order to stimulate combustion of the mixture gas.

As for the fuel injected into the combustion chamber 6 in the second half of the compression stroke, since the pressure inside the combustion chamber 6 is high and the time up to compression top dead center is short, the fuel will not be diffused throughout the combustion chamber 6, and stays at the center of the combustion chamber 6. Therefore, if the fuel is injected into the combustion chamber 6 in the second half of the compression stroke, a rich mixture gas with a high air-fuel ratio (A/F: a ratio of the mass A of air to the mass F of the fuel inside the combustion chamber 6) can be formed inside the combustion chamber 6. In this embodiment, the injector 15 and the ignition plug 16 are disposed at positions comparatively close to each other, and the rich mixture gas is formed around the ignition plug 16. Thus, if the rich mixture gas is formed inside the combustion chamber 6 near a compression top dead center, this mixture gas can be securely combusted by ignition energy given from the ignition plug 16. In addition, the temperature inside the combustion chamber 6 can be raised, and the remaining mixture gas can also be appropriately self-ignited. That is, SPCCI combustion of the mixture gas can be appropriately carried out.

Figure 8A:
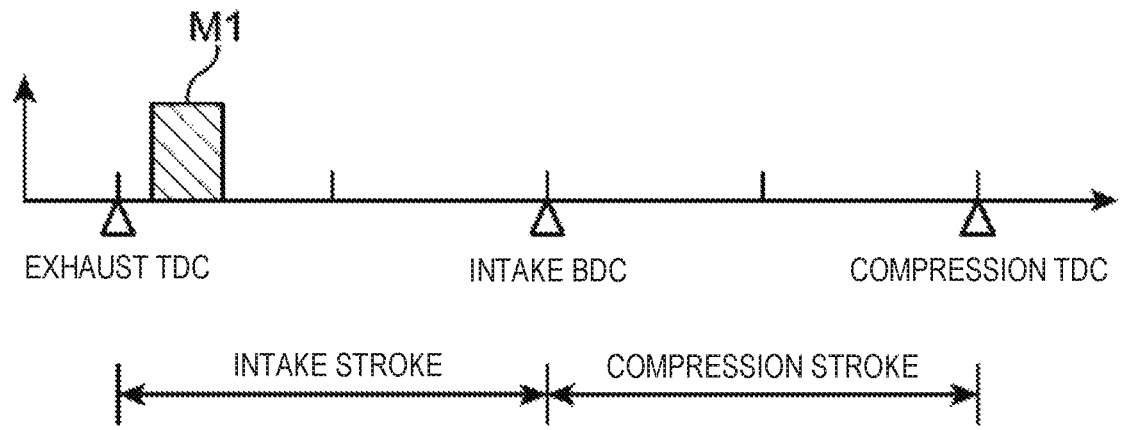
FIGS. 8A and 8B are views illustrating patterns of a fuel injection, where
Figure 8B:
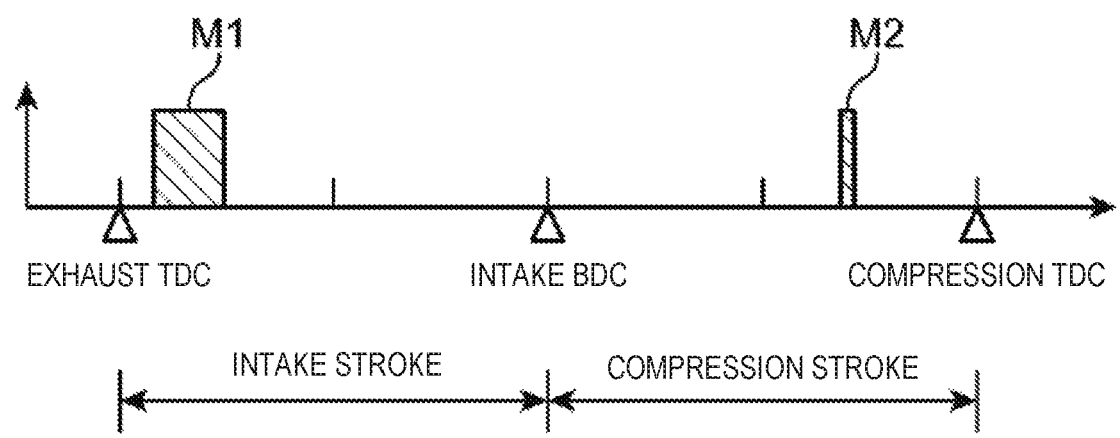

FIGS. 8A and 8B are views illustrating patterns of the fuel injection in the first operating range A1, where FIG. 8A is an injection pattern during a steady operation, and FIG. 8B is an injection pattern during the torque down. As illustrated in FIG. 8A, in the first operating range A1, all of the fuel to be injected into one cycle into the combustion chamber 6 is injected (M1) in an intake stroke during the steady operation, as described above. On the other hand, when the torque down request is issued and the engine load falls to a load included in the first operating range A1, a portion of the fuel to be injected into one cycle into the combustion chamber 6 is injected (M1) in an intake stroke, and the remaining fuel is injected (M2) in the second half of a compression stroke, as illustrated in FIG. 8B. Here, in the first operating range A1, as described above, the fuel injection (M1) carried out in the intake stroke is an example of a "first injection" in the present disclosure, and the fuel injection (M2) carried out in the second half of the compression stroke is an example of a "second injection" in the present disclosure.

Figure 9A:
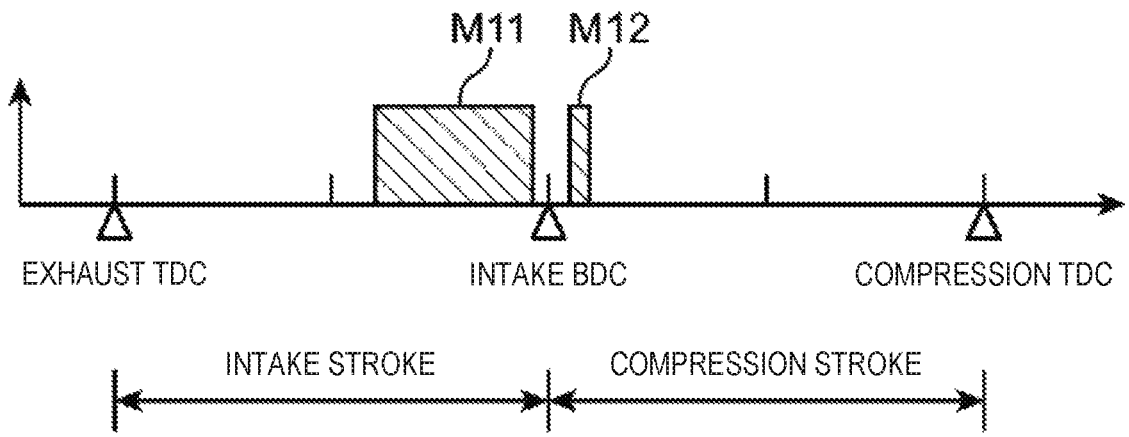
FIGS. 9A and 9B are views illustrating patterns of a fuel injection, where
Figure 9B:
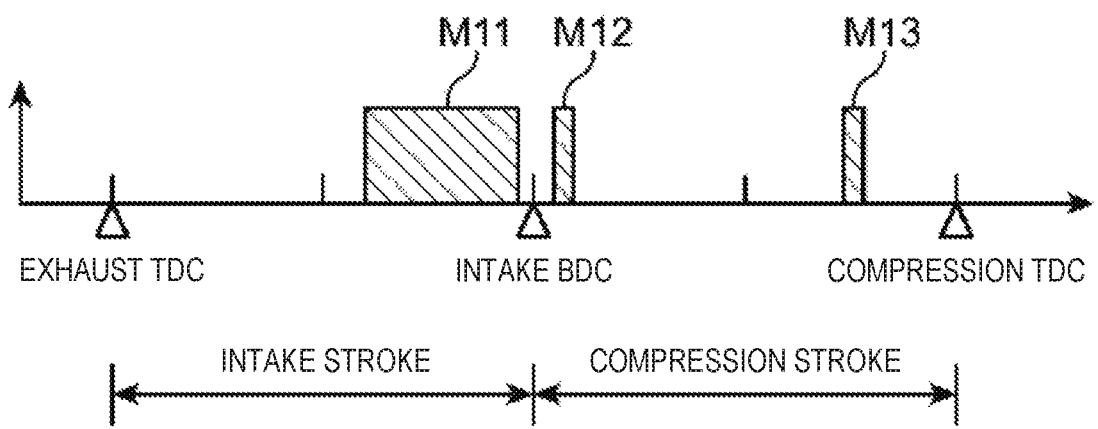

FIGS. 9A and 9B are views illustrating patterns of the fuel injection in the second operating range A2, where FIG. 9A is an injection pattern during the steady operation, and FIG. 9B is an injection pattern during the torque down. As illustrated in FIG. 9A, in the second operating range A2, during the steady operation, a large portion of the fuel to be injected into one cycle into the combustion chamber 6 is injected (M11) in an intake stroke, and the remaining fuel is injected (M12) in the first half of a compression stroke, as described above. On the other hand, when the torque down request is issued and the engine load falls to a load included in the first operating range A1, as illustrated FIG. 9B, a portion of the fuel to be injected into one cycle into the combustion chamber 6 is injected (M11) in the intake stroke, a portion of the remaining fuel is injected (M12) in the first half of the compression stroke, and the remaining fuel is injected (M13) in the second half of the compression stroke. In the second operating range A2, as described above, the fuel injection (M11) carried out in the intake stroke and the fuel injection (M12) carried out in the first half of the compression stroke are another example of the "first injection" in the present disclosure, and the fuel injection (M13) carried out in the second half of the compression stroke is another example of the "second injection" in the present disclosure. Below, the fuel injection (M2 or M13) carried out in the second half of a compression stroke is suitably referred to as an "additional injection."

Thus, in this embodiment, during the steady operation, the entire amount of fuel to be supplied into the combustion chamber 6 in one combustion cycle is injected in a period from an intake stroke to the first half of a compression stroke, and the additional injection in which fuel is injected into the combustion chamber 6 in the second half of the compression stroke is stopped. On the other hand, during the torque down, this additional injection is carried out, and a ratio of the amount of fuel injected into the combustion chamber 6 by the additional injection to the total amount of fuel to be supplied to the combustion chamber 6 in one combustion cycle is increased from zero.

Here, in this embodiment, while the total amount of fuel injected into the combustion chamber 6 in one combustion cycle is maintained constant when carrying out and not carrying out the additional injection, the amount of fuel for the additional injection is increased, and therefore, the amount of fuel for the fuel injection which is carried out before the additional injection is reduced because of the additional injection. In detail, in the first operating range A1, the amount of fuel injected into the combustion chamber 6 by the fuel injection (M1) carried out in the intake stroke is reduced because of the additional injection (M2). Further, in the second operating range A2, the amount of fuel injected into the combustion chamber 6 by the fuel injections (M11 and M12) carried out in the intake stroke and the first half of the compression stroke is reduced because of the additional injection (M13).

In this embodiment, when carrying out the additional injection, about 20% of the total amount of fuel to be injected into the combustion chamber 6 in one combustion cycle is injected into the combustion chamber 6 by the additional injection.

Moreover, in this embodiment, in the SPCCI range A, when the torque down request is issued and there is a request for reducing the amount of external EGR gas, the valve overlap period t_VOL of the intake valve 11 and the exhaust valve 12 is made smaller than the value during the steady operation. If the valve overlap period t_VOL of the intake valve 11 and the exhaust valve 12 is made smaller, the amount of internal EGR gas that remains inside the combustion chamber 6 (i.e., inactive gas) becomes smaller. Therefore, combustion of the mixture gas inside the combustion chamber 6 is stimulated. In this embodiment, in the SPCCI range A, the valve overlap is realized by opening the intake valve 11 and the exhaust valve 12 over the exhaust top dead center, as described above. Therefore, if this valve overlap period t_VOL becomes smaller, the amount of burnt gas that returns to the combustion chamber 6 after being drawn into the intake passage 30 and the exhaust passage 40 decreases, and therefore, the amount of internal EGR gas is effectively reduced.

Figure 10:
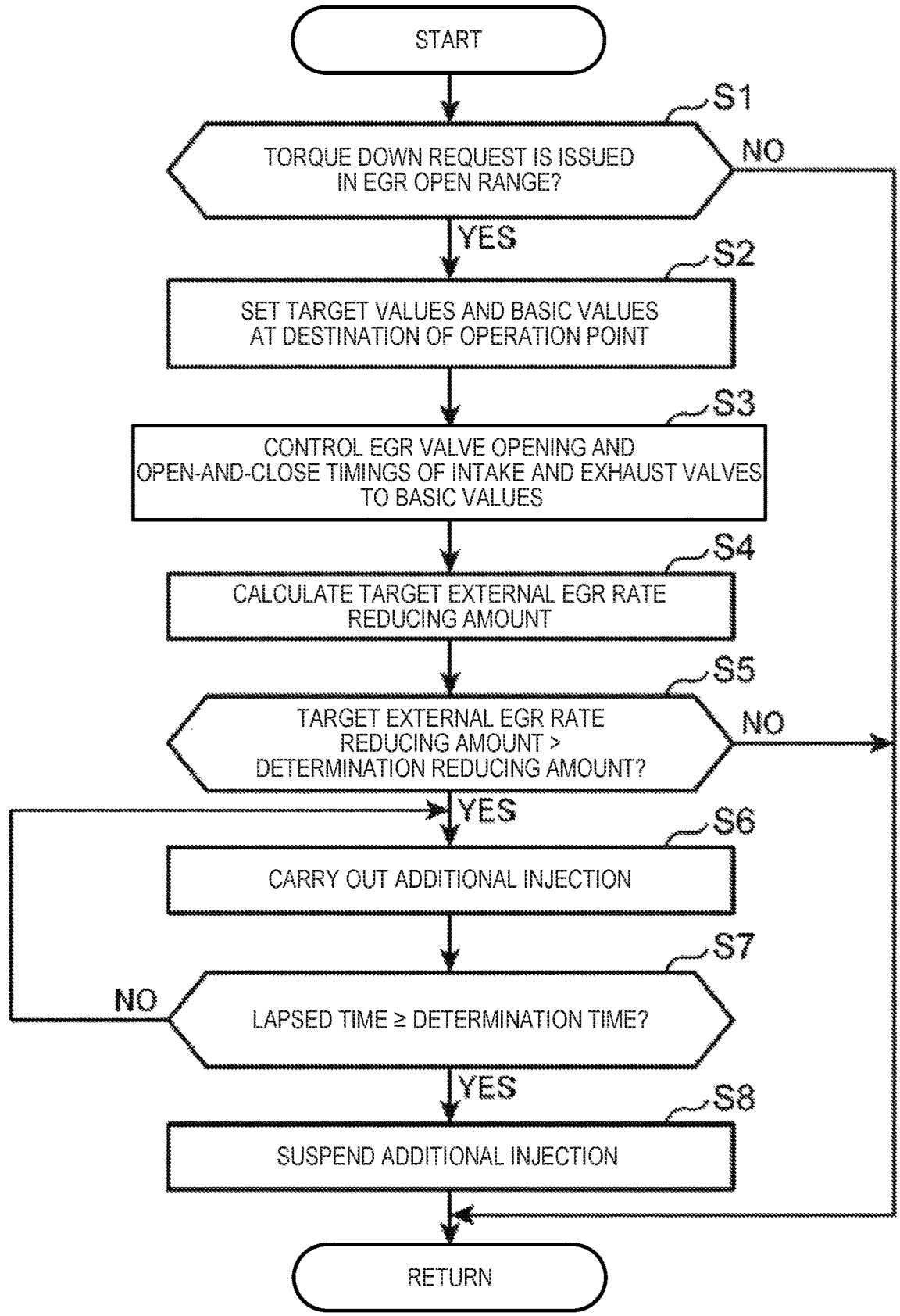
FIG. 10 is a flowchart illustrating a flow of an injection control during the torque down.
Figure 11:
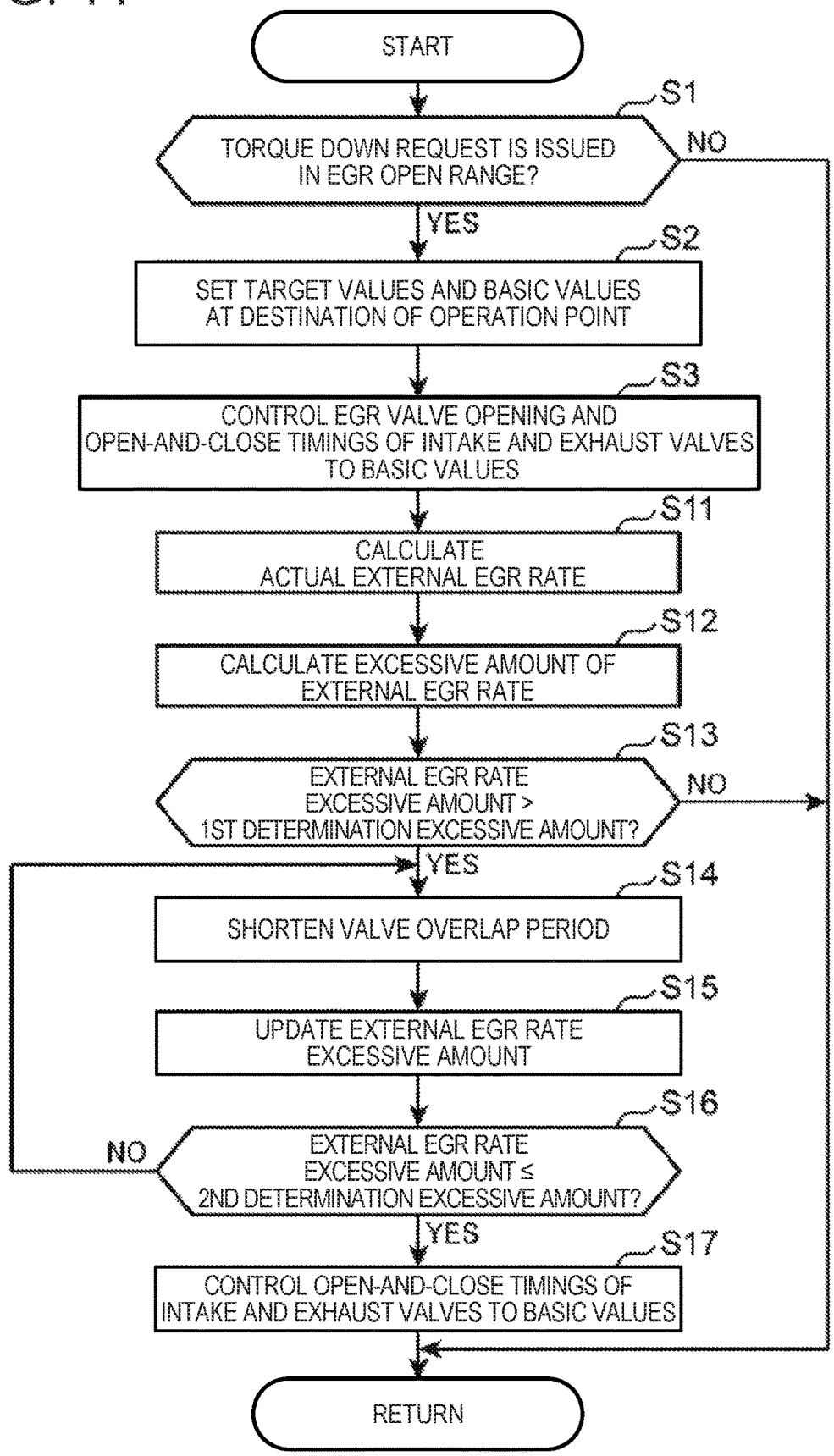
FIG. 11 is a flowchart illustrating a flow of a control of the valve overlap period during the torque down.

The control during this transition is described in detail using flowcharts of FIGS. 10 and 11. Note that as described above, the case where the torque down request is issued from the transmission 60 to the ECU 100 in connection with the upshift is described here. FIGS. 10 and 11 are flowcharts illustrating a flow of a control related to the additional injection and a flow of a control related to the valve overlap period, respectively.

In FIG. 10, first, the ECU 100 determines at Step S1 whether the torque down request is issued during the operation in the EGR open range A12. The ECU 100 determines whether the engine is operated in the EGR open range A12 based on the engine speed and the engine load. Moreover, as described above, when a command signal of the torque down request is received from the transmission control device, the ECU 100 determines that the torque down request is issued.

After Step S1, the process shifts to Step S2. At Step S2, the ECU 100 calculates a destination of the operation point (destinations of the engine speed and the engine load) in connection with the reduction of the engine torque in response to the torque down request, and sets a target value and a basic value of each parameter at the destination of the operation point. In detail, the ECU 100 sets a target external EGR rate, a basic EGR valve opening, a basic ignition timing, intake basic open-and-close timings, and exhaust basic open-and-close timings at the destination of the operation point.

The target external EGR rate is a target value of the external EGR rate during the steady operation (i.e., when the engine body 1 is operated steadily), and it is set like the graph of FIG. 6 when the engine speed is the given speed N10. In this embodiment, the target external EGR rate is set beforehand corresponding to each engine speed and each engine load, and the target external EGR rate are stored in the ECU 100 in the form of a map. The ECU 100 extracts the target external EGR rate corresponding to the destinations of the engine speed and the engine load from this map.

The basic EGR valve opening is a basic value of the opening of the EGR valve 53. The basic EGR valve opening is an opening of the EGR valve 53 at which the target external EGR rate described above is realized fundamentally during the steady operation. In this embodiment, the basic EGR valve opening is set beforehand corresponding to each engine speed and each engine load, and the target external EGR rate are stored in the ECU 100 in the form of a map. The ECU 100 extracts the basic EGR valve opening corresponding to the destinations of the engine speed and the engine load from this map.

The basic ignition timing is an ignition timing during the steady operation. In this embodiment, the basic ignition timing is set beforehand corresponding to each engine speed and each engine load, and the basic ignition timings are stored in the ECU 100 in the form of a map. The ECU 100 extracts the basic ignition timing corresponding to the destinations of the engine speed and the engine load from this map.

The intake basic open-and-close timings are basic values of the open-and-close timings (the open timing and the close timing) of the intake valve 11. The exhaust basic open-and-close timings are basic values of the open-and-close timings (the open timing and the close timing) of the exhaust valve 12. The intake basic open-and-close timings and the exhaust basic open-and-close timing are open-and-close timings of the intake valve 11 and the exhaust valve 12 during the steady operation, and a basic overlap period which is a valve overlap period when these intake basic open-and-close timings and exhaust basic open-and-close timing are realized is set so as to become the graph of FIG. 7 at the given engine speed N10. In this embodiment, the intake basic open-and-close timings and the exhaust basic open-and-close timings are set beforehand corresponding to each engine speed and each engine load, and the intake basic open-and-close timings and the exhaust basic open-and-close timings are stored in the ECU 100 in the form of a map. The ECU 100 extracts the intake basic open-and-close timings and the exhaust basic open-and-close timings corresponding to the destinations of the engine speed and the engine load from the respective maps.

After Step S2, the process shifts to Step S3. At Step S3, the ECU 100 sets the opening of the EGR valve 53 to the basic EGR valve opening set at Step S2, and drives the intake VVT 13a and the exhaust VVT 14a so that the open-and-close timings of the intake valve 11 and the exhaust valve 12 become the intake basic open-and-close timings and the exhaust basic open-and-close timings which are set at Step S2, respectively.

After Step S3, the process shifts to Step S4. Here, in this embodiment, when the target external EGR rate falls, it is determined that the request for reducing the amount of external EGR gas introduced into the combustion chamber 6 is issued, and therefore, at Step S4, the ECU 100 determines whether the target external EGR rate is reduced. In detail, at Step S4, the ECU 100 calculates a target external EGR rate reducing amount which is a target value of the reducing amount of the external EGR rate (a value of the external EGR rate to be reduced) by subtracting the target exterior EGR at the destination of the operation point calculated at Step S2 from the target external EGR rate when the torque down request is issued.

After Step S4, the process shifts to Step S5. At Step S5, the ECU 100 determines whether the target external EGR rate reducing amount calculated at Step S4 is larger than a given determination reducing amount. The determination reducing amount is set beforehand and stored in the ECU 100. In this embodiment, the determination reducing amount is set as zero.

If the determination at Step S5 is NO and the target external EGR rate reducing amount is below the determination reducing amount, the process ends without carrying out the additional injection (it returns to Step S1).

On the other hand, if the determination at Step S5 is YES and the target external EGR rate reducing amount is larger than the determination reducing amount, it shifts to Step S6. At Step S6, the ECU 100 carries out the additional injection.

Here, when the target external EGR rate decreases, the basic EGR valve opening also decreases (the opening becomes the closing side). Therefore, if the determination at Step S5 becomes YES and the target external EGR rate reducing amount is larger than the determination reducing amount, the basic EGR valve opening was set as the opening at the closing side at Step S2, and in connection with this, the opening of the EGR valve 53 is also changed to an opening at the closing side at Step S3. That is, in this embodiment, if the determination at Step S5 is YES and the target external EGR rate reducing amount is larger than the determination reducing amount, the opening of the EGR valve 53 is reduced.

After Step S6, the process shifts to Step S7. At Step S7, the ECU 100 determines whether the elapsed time after the torque down request is issued is more than a given determination time. This determination time is set beforehand and stored in the ECU 100. For example, this determination time is set as about 0.2 seconds.

If the determination at Step S7 is YES and the elapsed time after the torque down request is issued is more than the determination time, it shifts to Step S8. At Step S8, the ECU 100 suspends the additional injection and ends this process (it returns to Step S1).

On the other hand, if the determination at Step S7 is NO and the elapsed time after the torque down request is issued is below the determination time, it returns to Step S6. That is, the ECU 100 repeats Step S6 until the elapsed time after the torque down request is issued becomes more than the determination time to continue the additional injection.

Thus, in this embodiment, when the torque down request is issued and there is a request for reducing the external EGR rate more than the determination reducing amount, the additional injection is carried out. Then, the additional injection is continued after the torque down request is issued until the determination time elapses.

In parallel to this control of the additional injection, the ECU 100 carries out Step S11 and the subsequent steps illustrated in FIG. 11, after carrying out Steps S1-S3.

First, after Step S3, the ECU 100 calculates at Step S11 an actual external EGR rate which is the present external EGR rate. In this embodiment, the ECU 100 estimates the present external EGR rate based on the present opening of the EGR valve 53, the present detection value of the pressure difference sensor SN6, the present detection value of the airflow sensor SN3, the present open-and-close timings of the intake valve 11 and the exhaust valve 12, etc.

After Step S11, the process shifts to Step S12. At Step S12, the ECU 100 calculates an excessive amount of the actual external EGR rate with respect to the target external EGR rate by subtracting the target external EGR rate at the destination set at Step S1 from the actual external EGR rate calculated at Step S11. Below, this excessive amount is suitably referred to as the "external EGR rate excessive amount."

After Step S12, the process shifts to Step S13. At Step S13, the ECU 100 determines whether the external EGR rate excessive amount calculated at Step S12 is larger than a given first determination excessive amount. The first determination excessive amount is set beforehand and stored in the ECU 100.

If the determination at Step S13 is NO and the external EGR rate excessive amount is below the first determination excessive amount, the process ends (it returns to Step 1).

On the other hand, if the determination at Step S13 is YES and the external EGR rate excessive amount is larger than the first determination excessive amount, it shifts to Step S14. At Step S14, the ECU 100 drives the intake VVT 13*a* and the exhaust VVT 14*a* so that the valve overlap period of the intake valve 11 and the exhaust valve 12 becomes shorter than the basic overlap period corresponding to the intake basic open-and-close timings and the exhaust basic open-and-close timings which are set at Step S2. In detail, the ECU 100 drives the exhaust VVT 14*a* so that the close timing of the exhaust valve 12 becomes a timing on the advancing side of the exhaust basic open-and-close timings (in other words, the exhaust basic close timing), and drives the intake VVT 13 *a* so that the open timing of the intake valve 11 becomes a timing on the retarding side of the intake basic open-and-close timing (in other words, the intake basic open timing). Note that only one of the advancing of the close timing of the exhaust valve 12 and the retarding of the open timing of the intake valve 11 may be carried out to shorten the valve overlap period. In this embodiment, the advancing amount of the close timing of the exhaust valve 12 and the retarding amount of the open timing of the intake valve 11 are the same amount. Moreover, the advancing amount and the retarding amount are increased as the external EGR rate excessive amount becomes larger and the reducing amount of the valve overlap period becomes larger.

After Step S14, the process shifts to Step S15. At Step S15, the ECU 100 updates the external EGR rate excessive amount. That is, the ECU 100 again calculates the present actual external EGR rate, and calculates the latest external EGR rate excessive amount by subtracting the target external EGR rate set at Step S2 from the newly calculated actual external EGR rate.

After Step S15, the process shifts to Step S16. At Step S16, the ECU 100 determines whether the external EGR rate excessive amount is smaller than a second determination excessive amount set beforehand. In this embodiment, the second determination excessive amount is set as the same value as the first determination excessive amount. Note that the second determination excessive amount may be a value smaller than the first determination excessive amount.

If the determination at Step S16 is YES, and the external EGR rate excessive amount becomes below the second determination excessive amount, it shifts to Step S17. At Step S17, the ECU 100 resumes the open-and-close timings of the intake valve 11 and the exhaust valve 12 to the basic open-and-close timings, and then ends this process (it returns to Step S1).

On the other hand, if the determination at Step S16 is NO and the external EGR rate excessive amount is still above the second determination excessive amount, it returns to Step S14. That is, the ECU 100 maintains the valve overlap period of the intake valve 11 and the exhaust valve 12 at a value smaller than the basic overlap period, until the external EGR rate excessive amount becomes smaller than the second determination excessive amount.

Thus, in this embodiment, when a torque down request is issued and there is a request for reducing the external EGR amount, the additional injection is carried out, and if the external EGR rate excessive amount at this time is larger than the first determination excessive amount, the valve overlap period of the intake valve 11 and the exhaust valve 12 is made smaller than the value during the steady operation (the basic overlap period). Then, when the determination time elapses after the torque down request is issued, the additional injection is suspended, and if the external EGR rate excessive amount becomes below the second determination excessive amount, the valve overlap period of the intake valve 11 and the exhaust valve 12 is resumed to the value during the steady operation (the basic overlap period).

(5) Operation, etc.

Figure 12:
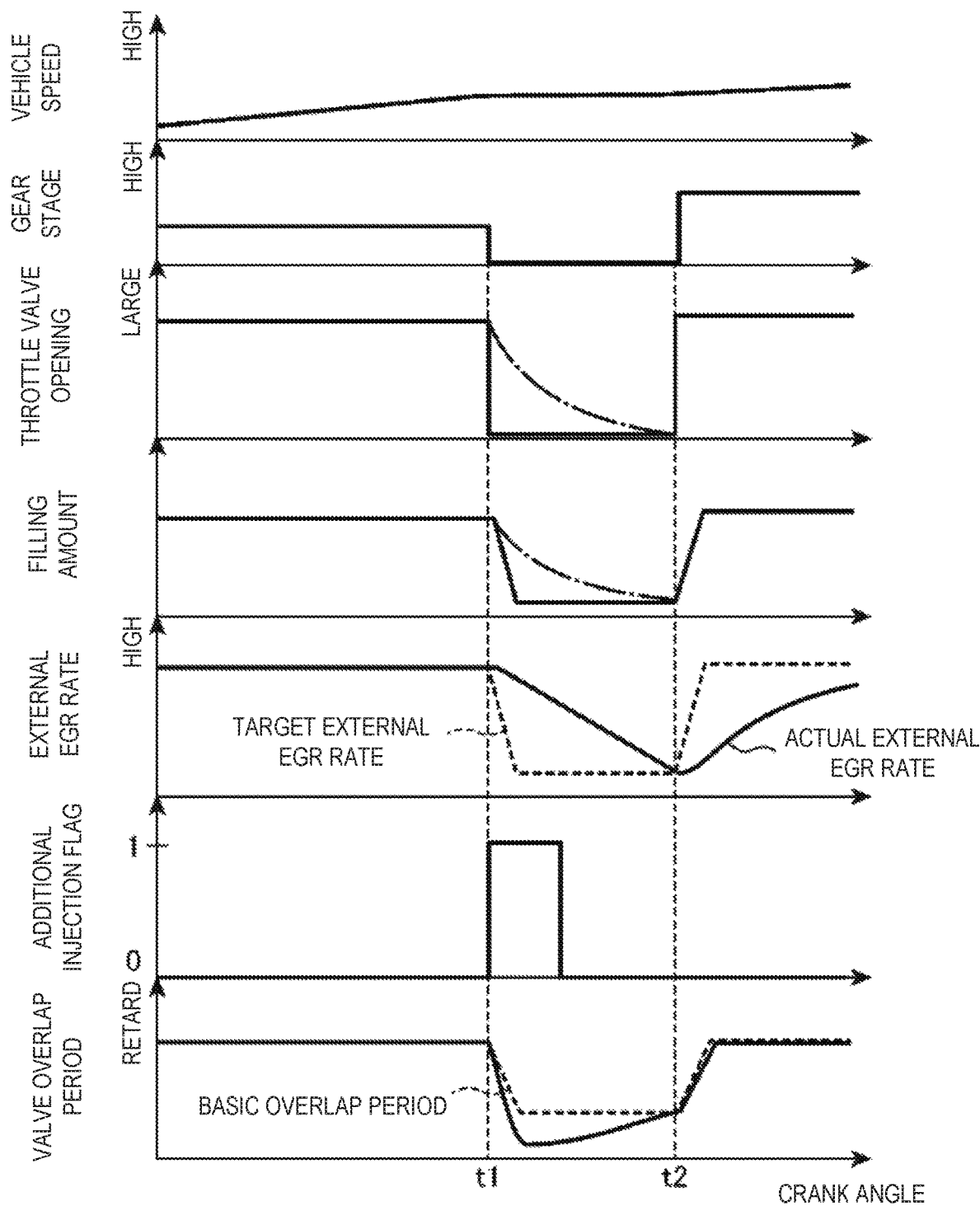
FIG. 12 is a time chart illustrating operation and effects of this embodiment.

FIG. 12 is a view illustrating a temporal change in each parameter when performing the control according to this embodiment. This figure illustrates graphs of a vehicle speed, a gear stage, a valve opening of the throttle valve 32, a filling amount, the external EGR rate, an additional injection execution flag, and the valve overlap period, in this order from the top. Note that the filling amount is an amount of air introduced into the combustion chamber 6, and is a parameter corresponding to the engine load. Moreover, the additional injection execution flag is a parameter which becomes 1 when the additional injection is carried out, and becomes 0 when the additional injection is suspended. Moreover, in the graph of the external EGR rate, a broken line is the target external EGR rate, and a solid line is the actual external EGR rate.

When the gear stage is made neutral and the torque down request is issued from the transmission control device in order to upshift at a time t1 (i.e., when the engine load falls to near zero), the throttle valve 32 is closed to near the fully close, and therefore, the filling amount drops. Moreover, after the time t1, the target external EGR rate falls with the fall of the engine load. However, as described above, the amount of external EGR gas introduced into the combustion chamber 6 does not decrease immediately, and the actual external EGR rate becomes larger than the target external EGR rate from the time t1 to a time t2.

Here, when the amount of external EGR gas runs short from the target amount in this way, the combustion of the mixture gas may become unstable, as described above. On the other hand, in this embodiment, the additional injection in which fuel is injected at the time t1 in the second half of a compression stroke is carried out.

Therefore, according to this embodiment, as described above, the rich mixture gas with the low air-fuel ratio can be formed inside the combustion chamber 6 by the additional injection, and the combustion of the mixture gas can be started more securely. Especially, in this embodiment, as described above, by forming the rich mixture gas around the ignition plug 16, the ignition energy is effectively supplied to this mixture gas, and the combustion of the mixture gas begins securely. Then, the temperature inside the combustion chamber 6 can be increased by the combustion of the mixture gas and self-ignition combustion of the remaining mixture gas can be carried out appropriately. Thus, according to this embodiment, the combustion can be prevented from becoming unstable, and the suitable SPCCI combustion can be realized more securely.

When the determination time elapses from the time t1 (at time t2), the additional injection is suspended.

Moreover, in this embodiment, after the time t1, since the actual external EGR rate is larger than the target external EGR rate, the valve overlap period is made smaller than the basic overlap period illustrated by the broken line.

When the valve overlap period is shortened, the internal EGR amount which is the inactive gas remaining in the combustion chamber 6 is reduced, as described above. Therefore, according to this embodiment, the inactive gas can be prevented from impeding the combustion of the mixture gas, and combustion stability can be further improved.

As described above, according to this embodiment, combustion stability can be improved more securely when the torque down request is issued.

Further, in this embodiment, fuel efficiency can be improved, and combustion stability can be improved while reducing the engine torque at an early stage.

In detail, as another method of avoiding that the combustion becomes unstable which is induced by the delay in the introduction of the external EGR gas accompanying the issue of the torque down request, there may be a method of delaying a closing speed of the throttle valve 32 as illustrated by a one-dot chain line in the graph of the throttle valve 32 of FIG. 12. That is, when the closing speed of the throttle valve 32 is slowed down, a decreasing speed of the amount of air introduced into the combustion chamber 6 can be slowed down. Therefore, the ratio of the mass of the burnt gas (including the external EGR gas and the internal EGR gas) inside the combustion chamber 6 to the air amount can be prevented from becoming excessive, thereby preventing the deterioration of combustion stability. However, by this method, since the amount of air introduced into the combustion chamber 6 is increased, it becomes impossible to fully reduce the engine torque. Thus, in order to prevent the insufficient reduction of the engine torque, the ignition timing may be retarded additionally. That is, when the closing speed of the throttle valve 32 is slowed down to slow down the decreasing speed of the amount of air introduced into the combustion chamber 6, and the ignition timing is retarded, the engine torque can be reduced while preventing the deterioration of combustion stability. However, in this case, since the combustion period of the mixture gas is retarded by the retarding of the ignition timing, fuel efficiency is deteriorated.

On the other hand, in this embodiment, by carrying out the additional injection and changing the valve overlap period as described above, since combustion stability can be secured, it is not necessary to slow down the closing speed of the throttle valve 32, and the engine torque can be reduced at an early stage, without retarding the ignition timing. Moreover, even if the control for slowing down the closing speed of the throttle valve and the control for retarding the ignition timing are carried out together, it is possible to keep the reducing amount of the closing speed of the throttle valve small, and to keep the retarding amount of the ignition timing small, thereby improving fuel efficiency, and improving combustion stability while reducing the engine torque at an early stage.

Particularly, in this embodiment, since the additional injection is carried out, while maintaining the total amount of fuel to be supplied to the combustion chamber 6 in one combustion cycle, without depending on carrying out or not carrying out the additional injection, it is possible to avoid the reduction of fuel efficiency which is induced by the additional injection, thereby improving combustion stability while improving fuel efficiency more securely.

(6) Modifications

Although in the above embodiment, when the request for reducing the amount of external EGR gas introduced into the combustion chamber 6 is issued, the additional injection is carried out, regardless of the amount of engine torque to be reduced when the torque down request is issued, the additional injection may be carried out only when the amount of engine torque to be reduced is more than a given value.

Moreover, although in the above embodiment it is determined whether the request for reducing the amount of external EGR gas introduced into the combustion chamber 6 is issued based on the amount of change in the target external EGR rate before and after the torque down request, the mass of the external EGR gas to be introduced into the combustion chamber 6 may be calculated, and when this mass falls, it may be determined that the request is issued.

Moreover, in the above embodiment, in the SPCCI range A, only when the torque down request is issued and there is the request for reducing the amount of external EGR gas, the additional injection is carried out to inject fuel in the second half of a compression stroke, the fuel may be injected into the second half of the compression stroke in other situations. However, in this configuration, when the torque down request is issued and there is the request for reducing the amount of external EGR gas, the ratio of fuel injected into the combustion chamber 6 by the additional injection to the total amount of fuel injected into the combustion chamber 6 in one combustion cycle is increased than the air-fuel ratio when there is not the request, and when there is the request, the mixture gas in which the air-fuel ratio is further richer (lower) is formed inside the combustion chamber 6.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
2 Cylinder
6 Combustion Chamber
15 Injector (Fuel Injection Device)
16 Ignition Plug (Ignition Device)
51 EGR Passage
53 EGR Valve
100 ECU (Controller)

What is claimed is:

1. A control device for a compression ignition engine comprising an engine body where a cylinder is formed, an intake passage where intake air introduced into the engine body circulates, an exhaust passage where exhaust gas discharged from the engine body circulates, and an exhaust gas recirculation (EGR) passage communicating the intake passage with the exhaust passage and configured to recirculate to the intake passage external EGR gas that is a part of the exhaust gas circulating the exhaust passage, the control device comprising:

an ignition device configured to ignite a mixture gas inside the cylinder;
an EGR valve configured to open and close the EGR passage;
a fuel injection device configured to supply fuel to the cylinder; and
a controller comprised of circuitry connected to the ignition device, the fuel injection device, and the EGR valve, and configured to output control signals to the ignition device, the fuel injection device, and the EGR valve,
wherein the controller outputs the control signal to the ignition device so as to ignite at a timing where partial compression ignition combustion takes place in which, after a portion of the mixture gas inside the cylinder carries out jump-spark ignition combustion, the remaining mixture gas combusts by self-ignition, wherein at least in a high-load range where the engine load is higher than a given value, within an operating range in which the partial compression ignition combustion is performed, the controller outputs the control signal to the EGR valve to open the EGR valve so that the external EGR gas is introduced into the cylinder, and outputs the control signal to the fuel injection device so that a first injection in which fuel is injected into the cylinder at least during a period from an intake stroke to the first half of a compression stroke is carried out, wherein while the engine body is operated in the high-load range, when a torque down request for reducing the engine torque and a request for reducing an amount of the external EGR gas introduced into the cylinder are issued, the controller outputs the control signal to the EGR valve so that the opening of the EGR valve is reduced, and outputs the control signal to the fuel injection device so that a second injection in which fuel is injected into the cylinder in the second half of the compression stroke is carried out, and a ratio of an amount of the fuel of the second injection to the total amount of fuel injected into the cylinder from the fuel injection device in one combustion cycle is increased more than the ratio when the torque down is not requested.

2. The control device of claim 1, further comprising a valve operating mechanism configured to change an amount of internal EGR gas that is burnt gas remaining in the cylinder, wherein while the engine body is operated in the high-load range, when the torque down request for reducing the engine torque is issued, the controller controls valve operating mechanism so that the amount of internal EGR gas decreases.

3. The control device of claim 2, wherein the engine body includes an intake port communicating with the intake passage, an exhaust port communicating with the exhaust passage, an intake valve configured to open and close the intake port, an exhaust valve configured to open and close the exhaust port, and the valve operating mechanism configured to drive at least one of the intake valve and the exhaust valve, and wherein the valve operating mechanism decreases the amount of internal EGR gas by driving the at least one of the intake valve and the exhaust valve so that a valve overlap period that is a period when an open period of the intake valve and an open period of the exhaust valve overlap with each other is reduced.

4. The control device of claim 3, wherein the engine body is mounted on a vehicle provided with a transmission configured to perform a speed-to-torque conversion of rotation of the engine body and transmit the converted rotation to wheels of the vehicle, and wherein when the torque down request is issued in association with a change in the gear stage of the transmission, the controller reduces the opening of the EGR valve, and increases the ratio of the amount of the fuel of the second injection to the total amount of fuel injected into the cylinder from the fuel injection device in one combustion cycle.

5. The control device of claim 2, wherein the engine body is mounted on a vehicle provided with a transmission configured to perform a speed-to-torque conversion of rotation of the engine body and transmit the converted rotation to wheels of the vehicle, wherein when the torque down request is issued in association with a change in the gear stage of the transmission, the controller reduces the opening of the EGR valve, and increases the ratio of the amount of the fuel of the second injection to the total amount of fuel injected into the cylinder from the fuel injection device in one combustion cycle.

6. The control device of claim 1, wherein the engine body is mounted on a vehicle provided with a transmission configured to perform a speed-to-torque conversion of rotation of the engine body and transmit the converted rotation to wheels of the vehicle, wherein when the torque down request is issued in association with a change in the gear stage of the transmission, the controller reduces the opening of the EGR valve, and increases the ratio of the amount of the fuel of the second injection to the total amount of fuel injected into the cylinder from the fuel injection device in one combustion cycle.

* * * * *